United States Patent
Nakao

(10) Patent No.: US 7,787,376 B2
(45) Date of Patent: Aug. 31, 2010

(54) COMMUNICATION METHOD FOR PERFORMING COMMUNICATIONS BETWEEN TWO RADIO APPARATUSES ACCORDING TO CHANNEL CHARACTERISTICS AND A RADIO APPARATUS USING THE COMMUNICATION METHOD

(75) Inventor: Seigo Nakao, Yokosuka (JP)

(73) Assignee: Sanyo Electric Co., Ltd., Osaka (JP)

( * ) Notice: Subject to any disclaimer, the term of this patent is extended or adjusted under 35 U.S.C. 154(b) by 293 days.

(21) Appl. No.: 11/976,439

(22) Filed: Oct. 24, 2007

(65) Prior Publication Data

US 2008/0125045 A1    May 29, 2008

(30) Foreign Application Priority Data

Oct. 24, 2006    (JP)    ............................. 2006-289100

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ........................ 370/232; 370/479; 455/428

(58) Field of Classification Search ................. 370/252, 370/329, 208, 232, 479; 455/277, 67.13, 455/95, 226.1, 428
See application file for complete search history.

(56) References Cited

U.S. PATENT DOCUMENTS

| | | | |
|---|---|---|---|
| 6,374,096 B1 * | 4/2002 | Parr | 455/226.1 |
| 2004/0131017 A1 * | 7/2004 | Penther | 370/252 |
| 2005/0136844 A1 * | 6/2005 | Giesberts et al. | 455/67.13 |
| 2006/0165191 A1 * | 7/2006 | Lin et al. | 375/267 |
| 2008/0045164 A1 * | 2/2008 | Usuda et al. | 455/95 |

OTHER PUBLICATIONS

Coleri S. et al. "Channel Estimation Techniques Based on Pilot arrangement in OFDM Systems", IEEE Transactions on Broadcasting, vol. 48, No. 3 Sep. 2002, pp. 223-229.

* cited by examiner

*Primary Examiner*—Ricky Ngo
*Assistant Examiner*—David Oveissi
(74) *Attorney, Agent, or Firm*—McDermott Will & Emery LLP

(57) ABSTRACT

A communication unit, which includes a modem unit, performs communications with a targeted radio by setting a communication rate variably. A control unit acquires a delay characteristic in a radio channel between the communication unit and the targeted radio apparatus and an error vector by the radio channel. As the communication rate, the control unit determines a coding rate of error correction and a modulation scheme, based on the acquired delay characteristic and the error vector. In particular, the control unit determines the coding rate based on the delay characteristic and determines the modulation scheme based on the error vector.

8 Claims, 20 Drawing Sheets

| L-STF | L-LTF | L-SIG | HT-SIG | HT-STF | HT-LTF | HT-LTF | -HT-LTF | DATA 1 |
| --- | --- | --- | --- | --- | --- | --- | --- | --- |
| L-STF -50ns | L-LTF -50ns | L-SIG -50ns | HT-SIG -50ns | HT-STF -400ns | HT-LTF -400ns | HT-LTF -400ns | -HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | -HT-LTF -600ns | -HT-LTF -600ns | DATA 4 -600ns |

FIG.9B

| L-STF | L-LTF | L-SIG | HT-SIG | HT-STF | HT-LTF | -HT-LTF | DATA 1 |
| --- | --- | --- | --- | --- | --- | --- | --- |
| L-STF -50ns | L-LTF -50ns | L-SIG -50ns | HT-SIG -50ns | HT-STF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | DATA 3 -200ns |

FIG.9C

| L-STF | L-LTF | L-SIG | HT-SIG | HT-STF | HT-LTF | DATA 1 |
| --- | --- | --- | --- | --- | --- | --- |
| L-STF -50ns | L-LTF -50ns | L-SIG -50ns | HT-SIG -50ns | HT-STF -400ns | -HT-LTF -400ns | DATA 2 -400ns |

FIG.12

| HT-STF1 | HT-LTF1 | HT-LTF5 | HT-LTF9 | HT-LTF13 | DATA A |
|---|---|---|---|---|---|
| HT-STF2 -50ns | HT-LTF2 -50ns | HT-LTF6 -50ns | HT-LTF10 -50ns | HT-LTF14 -50ns | DATA B -50ns |
| HT-STF3 -100ns | HT-LTF3 -100ns | HT-LTF7 -100ns | HT-LTF11 -100ns | HT-LTF15 -100ns | DATA C -100ns |
| HT-STF4 -150ns | HT-LTF4 -150ns | HT-LTF8 -150ns | HT-LTF12 -150ns | HT-LTF16 -150ns | DATA D -150ns |

COMMUNICATION METHOD FOR PERFORMING COMMUNICATIONS BETWEEN TWO RADIO APPARATUSES ACCORDING TO CHANNEL CHARACTERISTICS AND A RADIO APPARATUS USING THE COMMUNICATION METHOD

CROSS-REFERENCE TO RELATED APPLICATIONS

This application is based upon and claims the benefit of priority from the prior Japanese Patent Application No. 2006-289100, filed on Oct. 24, 2006, the entire contents of which are incorporated herein by reference.

BACKGROUND OF THE INVENTION

1. Field of the Invention

The present invention relates to a communication technology, and it particularly relates to a communication method for performing communications between two radio apparatuses according to channel characteristics and a radio apparatus utilizing said method.

2. Description of the Related Art

An OFDM (Orthogonal Frequency Division Multiplexing) modulation scheme is one of multicarrier communication schemes that can realize high-speed data transmission and are robust in multipath environments. This OFDM modulation scheme has been used in the wireless standards such as IEEE802.11a/g and HIPERLAN/2. Packet signals in such a wireless LAN are generally transmitted through a time-varying channel environment and are also subject to the effect of frequency selective fading. Hence, a receiving apparatus carries out the channel estimation dynamically.

In order for the receiving apparatus to carry out the channel estimation, two kinds of known signals are provided within a packet signal. One is the known signal, provided for all carries in the beginning of the packet signal, which is the so-called preamble or training signal. The other one is the known signal, provided for part of carriers in a data area of the packet signal, which is the so-called pilot signal.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is a MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data and the like to be transmitted in parallel in the packet signal is called "stream"). That is, streams up to the maximum number of antennas are set for the communications between the transmitting apparatus and the receiving apparatus so as to improve the data transmission rates. Moreover, combining this MIMO system with the OFDM modulation scheme results in a higher data transmission rate.

In the MIMO system, the data rate can also be adjusted by increasing or decreasing the number of antennas to be used for data communications. Furthermore, the data rate can be adjusted in greater detail by applying adaptive modulation to the MIMO system. Communications according to channel characteristics between a transmitting apparatus and a receiving apparatus are performed in adaptive modulation. Thus communications suited for the channel characteristics are performed. To enhance the processing accuracy of adaptive modulation, it is desired that channel characteristics between a plurality of antennas included in the receiving apparatus and a plurality of antennas included in the transmitting apparatus be acquired. To enhance the accuracy in acquiring the channel characteristics, a transmitting apparatus or receiving apparatus sends known signals for use in channel estimation, from all of the antennas. Hereinafter, known signals, for use in channel estimation, assigned to a plurality of streams are called "training signals" independently of the number of streams to which data are assigned. For example, even in the case when data are assigned to two streams, training signals are assigned to four streams.

Under these circumstances, the inventor of the present invention came to recognize the following problems to be solved. In general, the adaptive modulation is executed based on EVM (Error Vector Magnitude), receiving strength and the like. However, when interleaving or error correction is being applied to a communication system such as a MIMO system, there are cases where the modulation scheme or coding rate of error correction suited to the then channel characteristic differs even if the same EVM value or receiving strength value is exhibited. More specifically, the effect of error correction differs in response to the magnitude of delay characteristics in a radio channel.

SUMMARY OF THE INVENTION

The present invention has been made in view of such circumstances and a general purpose thereof is to provide a communication technique by which to select a modulation scheme and error correction suitable for a radio channel.

In order to resolve the above problems, a radio apparatus according to one embodiment of the present invention comprises: a communication unit which performs communications with a targeted radio apparatus by varying a communication rate therefor; an acquiring unit which acquires a delay characteristic in a radio channel between the communication unit and the targeted radio apparatus, and an error vector by the radio channel; and a decision unit which determines a communication rate to be set for the communication unit, based on the delay characteristic and the error vector acquired by the acquiring unit.

The "acquiring" may correspond to a case when delay characteristics and error vectors derived in the targeted radio apparatus or may correspond to a case when the delay characteristics and the error vectors are derived in the radio apparatus including the communication unit. That is, it suffices if the delay characteristics and the error vector are acquired finally. According to this embodiment, the communication speed is determined with use of the delay characteristic in addition to the error vector. Hence, the communication rate can be determined by taking the effect of the delay characteristics into account.

The communication unit may set at least a coding rate of error correction and a modulation scheme, as the communication rate, and the decision unit may determine the coding rate based on the delay characteristic and determine the modulation scheme based on the error vector. In such a case, the coding rate is determined based on the delay characteristic, so that the communication rate can be determined by taking the effect of error correction into account.

Another embodiment of the present invention relates also to a radio apparatus. This radio apparatus comprises: a communication unit which performs communications with a targeted radio apparatus by varying a communication rate therefor; an acquiring unit which acquires error vectors by a radio channel between the communication unit and the targeted radio apparatus; and a decision unit which determines a communication rate to be set for the communication unit, based on an average value of the error vectors acquired by the acquiring unit and a degree of variation in the error vectors.

The "degree of variation" corresponds to a value, such as a variance value or standard deviation value, indicating how dispersed or deviated from an average value, for example, or any value calculated by a similar method. The difference between the maximum value and the minimum value, the difference between the average value and the maximum value, the difference between the average value and the minimum value and so forth may also be used as a measure to indicate the degree of variation. By employing this embodiment, the communication rate is determined by making use of the degree of variation in the error vectors in addition to the average value of error vectors, so that the communication rate can be determined by taking the effect of the delay characteristics into account.

The communication unit may set at least a coding rate of error correction and a modulation scheme, as the communication rate, and the decision unit may determine the coding rate based on the degree of variation in the error vectors and determine the modulation scheme based on the average value of the error vectors. In this case, the coding rate is determined based on the degree of variation in the error vectors, so that the communication rate can be determined by taking the effect of error correction into account.

Still another embodiment of the present invention relates also to a radio apparatus. This radio apparatus comprises: a communication unit which performs communications with a targeted radio apparatus by varying a communication rate therefor wherein the communications use a plurality of streams; an acquiring unit which acquires, per stream, a physical quantity on signal strength in a radio channel between the communication unit and the targeted radio apparatus; and a decision unit which determines a communication rate to be set for the communication unit, based on any of a plurality of physical quantities, acquired by the acquiring unit, which correspond mutually to the plurality of streams and differences among the plurality of physical quantities.

According to this embodiment, the communication rate is determined by making use of differences among the physical quantities in addition to a physical quantity, so that the communication rate can be determined by taking the effect of delay characteristics into account.

The acquiring unit may acquire an error vector as the physical quantity, and in the event that any of plurality of the error vectors are identical to each other, the decision unit may use a higher communication rate as a difference thereof is larger. In this case, the difference is reflected in determining the communication rate, so that the communication rate can be determined by taking the effect of error correction into account.

The communication unit may have a plurality of first antennas by which the communication unit performs communications with the targeted radio apparatus having a plurality of second antennas; the acquiring unit may acquire singular values of a channel matrix as the physical quantity wherein the channel matrix has the number of elements determined by the number of the first antennas and the number of the second antennas and has values of the elements representing channel characteristics between the plurality of first antennas and the plurality of second antennas, respectively; and in the event that any of plurality of the error vectors are identical to each other, the decision unit may use a higher communication rate as a difference thereof is larger. In such a case, the difference is reflected in determining the communication rate, so that the communication rate can be determined by taking the effect of error correction into account.

As any of the plurality of physical quantities the decision unit may use a physical quantity which is to correspond to a lower communication rate among communication rates suitable respectively for the plurality of physical quantities. In this case, the physical quantity which is to correspond to a lower communication rate, so that the communication rate which is reliably feasible can be selected.

Still another embodiment of the present invention relates to a communication method. This method comprises: performing communications with a targeted radio apparatus by varying a communication rate therefor; acquiring error vectors by a radio channel between the radio apparatus and the targeted radio apparatus; and determining a communication rate to be set, based on an average value of the acquired error vectors and a degree of variation in the error vectors.

The performing communications therewith may set at least a coding rate of error correction and a modulation scheme, as the communication rate, and the determining may determine the coding rate based on the delay characteristic and determine the modulation scheme based on the error vector.

Still another embodiment of the present invention relates also to a communication method. This method comprises: performing communications with a targeted radio apparatus by varying a communication rate therefor wherein the communications use a plurality of streams; acquiring, per stream, a physical quantity on signal strength in a radio channel between the radio apparatus and the targeted radio apparatus; and determining a communication rate to be set, based on any of a plurality of physical quantities acquired in the acquiring, which correspond mutually to the plurality of streams and differences among the plurality of physical quantities.

The acquiring may acquire an error vector as the physical quantity, and in the event that any of plurality of the error vectors are identical to each other, the determining may use a higher communication rate as a difference thereof is larger.

The performing communications therewith may be such that communications between the targeted radio apparatus having a plurality of second antennas and a radio apparatus are performed using a plurality of first antennas; the acquiring may acquire singular values of a channel matrix as the physical quantity wherein the channel matrix has the number of elements determined by the number of the first antennas and the number of the second antennas and has values of the elements representing channel characteristics between the plurality of first antennas and the plurality of second antennas, respectively; and in the event that any of plurality of the error vectors are identical to each other, the determining may use a higher communication rate as a difference thereof becomes larger. As any of the plurality of physical quantities the determining may use a physical quantity which is to correspond to a lower communication rate among communication rates suitable respectively for the plurality of physical quantities.

Still another embodiment of the present invention relates also to a communication method. This method comprises: performing communications with a targeted radio apparatus by varying a communication rate therefor; acquiring a delay characteristic of a radio channel between the targeted radio apparatus and a radio apparatus and acquiring an error vector by the radio channel; and determining a communication rate to be set, based on the delay characteristic and the error vector acquired in the acquiring.

The performing communications therewith may set at least a coding rate of error correction and a modulation scheme, as the communication rate, and the determining may determine the coding rate based on the delay characteristic and determine the modulation scheme based on the error vector.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 9A to 9C each illustrate a packet format for the communication system shown in FIG. 8;

FIG. 12 shows packet formats of a packet signal that is finally transmitted in the communication system shown in FIG. 8;

DETAILED DESCRIPTION OF THE INVENTION

The invention will now be described by reference to the preferred embodiments. This does not intend to limit the scope of the present invention, but to exemplify the invention.

An outline of the present invention will be given before a specific description thereof. Exemplary embodiments of the present invention relate to a communication system comprised of at least two radio apparatuses. An OFDM modulation scheme, error correction and interleaving are used in the communication system. One of the radio apparatuses corresponds to a transmitting apparatus whereas the other thereof corresponds to a receiving apparatus. The communication system changes the modulation scheme and the coding rate of error correction by executing an adaptive modulation. For clarity of description, however, a description is given here of adaptive modulation processing of a downlink from a base station apparatus to a terminal apparatus. The base station apparatus transmits a signal requesting a channel characteristic of the downlink and EVM (hereinafter this signal being referred to as "request signal") to the terminal apparatus. When the terminal apparatus receives the request signal, the terminal apparatus derives the channel characteristics and EVM. More concretely, EVM is derived for components of each subcarrier, and EVM is derived by averaging the thus derived EVMs over one OFDM. Hereinbelow, there are cases where the averaged EVM is also called "EVM". The channel characteristic has per-subcarrier components in the frequency domain. The terminal apparatus transmits a signal containing information on the channel characteristic and EVM to the base station apparatus, where this signal containing such information is hereinafter referred to as "response signal".

The EVM that the base station apparatus has received is equivalent to a status of signal distortion in a radio channel. Thus, the smaller the EVM, it is more possible to raise the communication rate. On the other hand, for the components of the channel characteristics the base station apparatus derives a correlation value between adjacent subcarriers. Such a correlation value corresponds to a delay characteristic of a radio channel. Accordingly, the delay characteristic has an adverse effect on the error correction validity. In other words, if the effect of delayed wave is small, continuous error is likely to increase even if interleave is executed. Thus, under such a circumstance, the effect of error correction will be small. This corresponds to the fact that even if the EVMs have the identical value, the communication rate must be lowered if the effect of delayed wave is small. Taking the above into consideration, the base station apparatus determines the coding rate based on delay characteristics and determines the modulation scheme based on EVMs.

Figure 1:
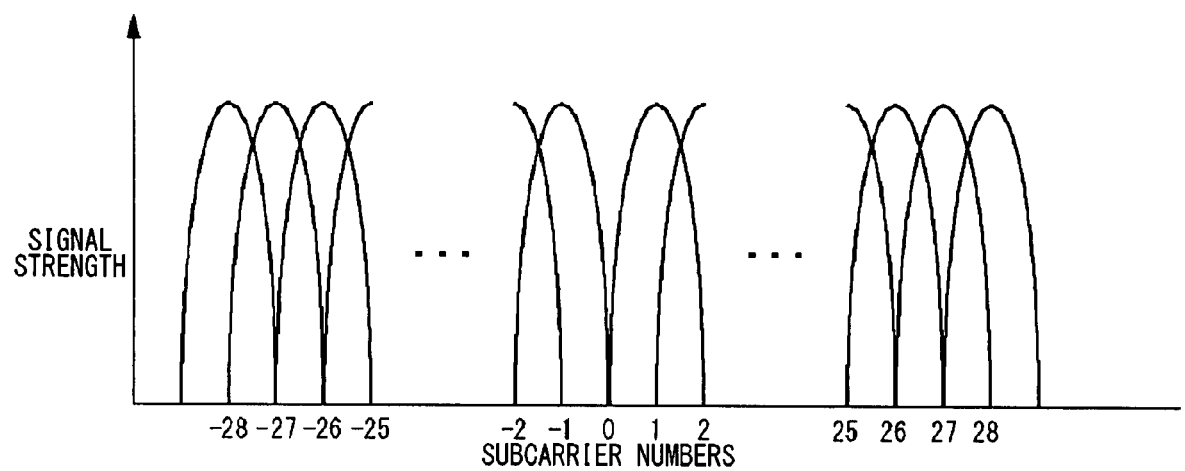
FIG. 1 illustrates a spectrum of a multicarrier signal according to an exemplary embodiment of the present invention.

FIG. 1 illustrates a spectrum of a multicarrier signal according to an exemplary embodiment of the present invention. In particular, FIG. 1 shows a spectrum of a signal in an OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a system (hereinafter referred to as a "legacy system") which is not compatible with a MIMO system. One example of legacy systems is a wireless LAN complying with the IEEE 802.11a standard. The unit of one signal in the time domain is the unit of one signal composed of a plurality of subcarriers. This unit will be called "OFDM symbol" herein.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation), 64-QAM and 256 QAM.

As an error correction scheme, convolutional coding is used for these signals. The coding rates for the convolutional coding are set to ½, ¾ and so forth. The number of data to be transmitted in parallel is set variably. As a result thereof, since the modulation scheme, the coding rate and the number of streams are set variably, the data rate is also set variably. It is to be noted that the "data rate" may be determined by arbitrary combination of these factors or by only one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
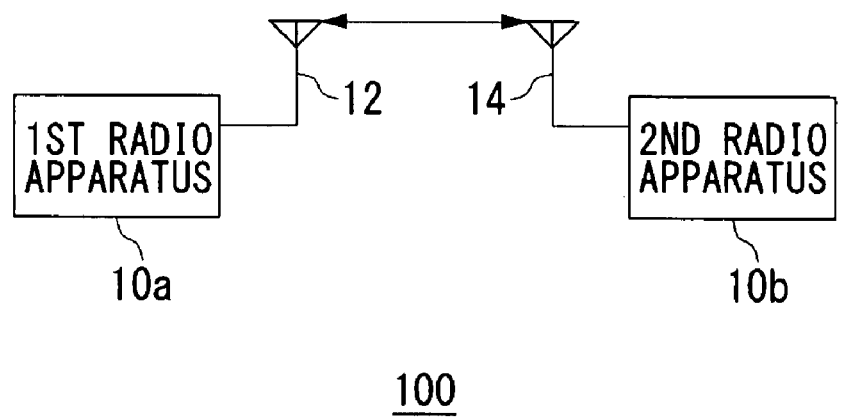
FIG. 2 illustrates a structure of a communication system according to an exemplary embodiment of the present invention.

FIG. 2 illustrates a structure of a communication system 100 according to an exemplary embodiment of the present invention. The communication system 100 includes a first radio apparatus 10a and a second radio apparatus 10b, which are generically referred to as "radio apparatus 10". The first radio apparatus 10a includes an antenna 12. The second radio apparatus 10b includes an antenna 14. Here, the first radio apparatus 10a corresponds to the base station apparatus, whereas the second radio apparatus 10b corresponds to the terminal apparatus. As described above, the communication system 100 uses the OFDM modulation scheme, and uses the error correction and interleaving. As described earlier, the adaptive modulation for the downlink is described in the exemplary embodiment. Thus, the first radio apparatus 10a performs communications with the second radio apparatus 10b, which is a communication party of the first radio apparatus 10a, by setting the communication rate variably.

Based on a signal from the first radio apparatus 10a, the second radio apparatus 10b derives a channel characteristic for a downlink from the antenna 12 to the antenna 14. Here, the channel characteristic is an index that indicates the degree of signal attenuation and the degree of phase rotation in a radio channel from the antenna 12 to the antenna 14. The channel characteristics are constituted by components corresponding respectively to a plurality of subcarriers. Further, the second radio apparatus 10b derives EVM. A method for deriving EVM will be discussed later. The second radio apparatus 10b sends the channel characteristics and EVM to the first radio apparatus 10a. Based on the channel characteristics received from the second radio apparatus 10b, the first radio apparatus 10a derives delay characteristics. At the same time, based on the delay characteristics and EVM, the first radio apparatus 10a determines the modulation scheme and the coding rate. Finally, while using the determined modulation scheme and coding rate, the first radio apparatus 10a transmits the data signal to the second radio apparatus 10b. Since a processing which is reverse to the processing described above suffices for the adaptive modulation for an uplink, the description related to the uplink will be omitted here.

Figure 3:
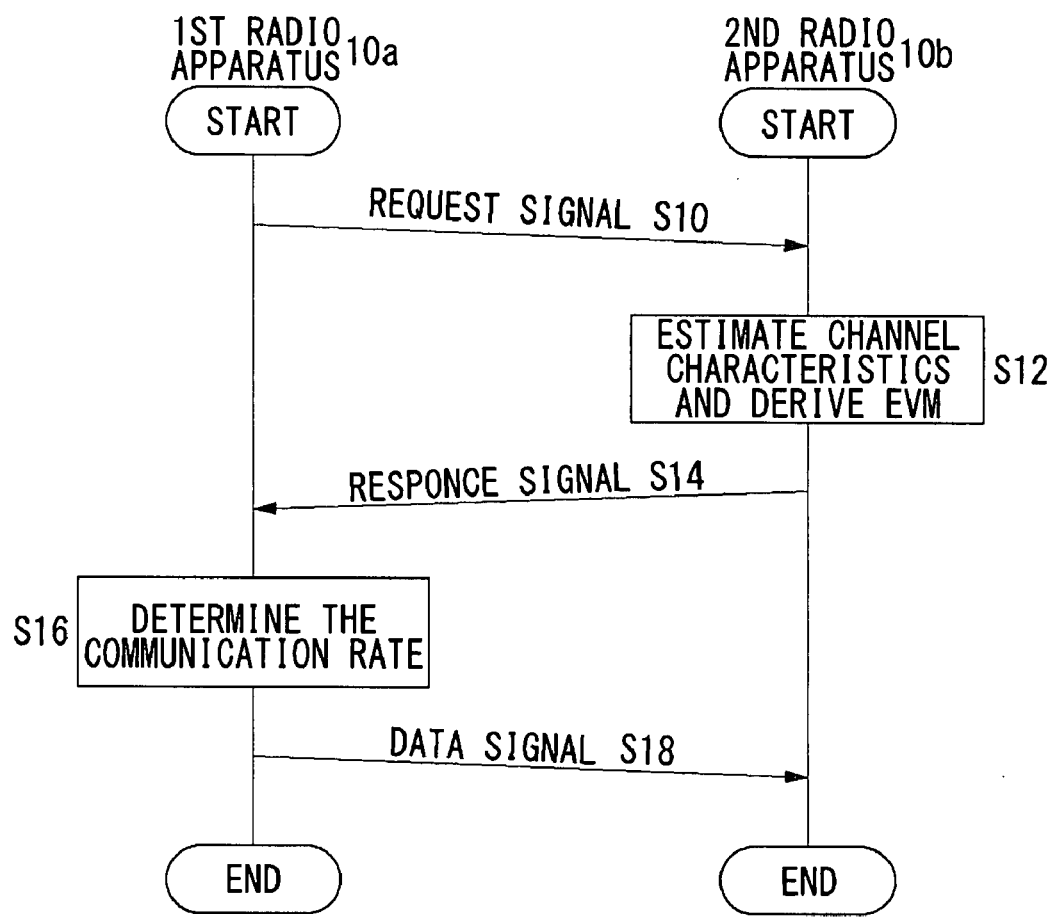
FIG. 3 is a sequence diagram showing a procedure for setting the communication rate in a communication system shown in FIG. 2.

An outline of adaptive modulation processing by the communication system 100 will now be described. FIG. 3 is a sequence diagram showing a procedure for setting the communication rate in the communication system 100. The first radio apparatus 10a transmits a request signal to the second radio apparatus 10b (S10). The second radio apparatus 10b estimates the channel characteristics based on the request signal and then derives EVM (S12). The second radio apparatus 10b transmits the estimated channel characteristics and the derived EVM to the first radio apparatus 10a as a response signal (S14). The first radio apparatus 10a determines the communication rate, based on the channel characteristics and EVM contained in the response signal (S16). Using the communication rate thus determined, the first radio apparatus 10a transmits data signals to the second radio apparatus 10b (S18).

Figure 4:
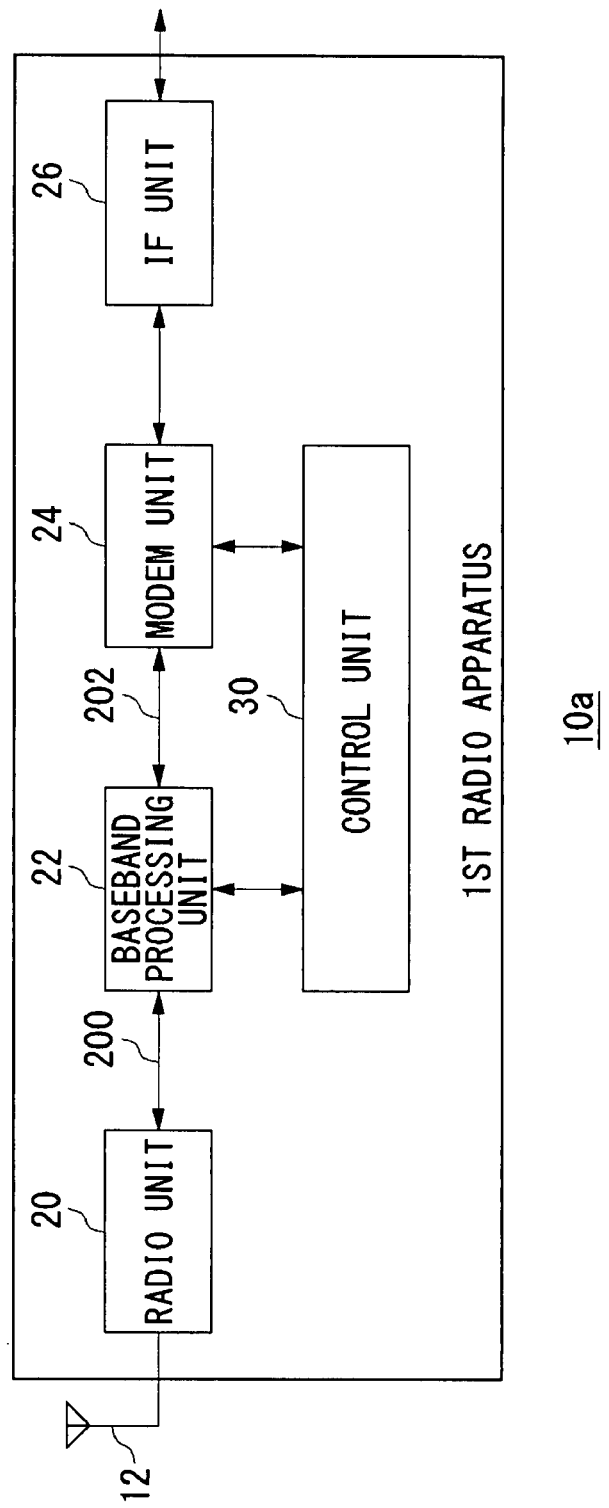
FIG. 4 illustrates a structure of a first radio apparatus shown in FIG. 2.

FIG. 4 illustrates a structure of the first radio apparatus 10a. The first radio apparatus 10a includes a radio unit 20, a baseband processing unit 22, a modem unit 24, an IF unit 26, and a control unit 30. Signals involved include a time-domain signal 200 and a frequency-domain signal 202. The second radio apparatus 10b is structured the same way as with the first radio apparatus 10a. Accordingly, in the following description, the description on the transmission of the request signal and the execution of the adaptive modulation corresponds to that of the processing in the first radio apparatus 10a, whereas the description on the estimation of channel characteristics, the derivation of EVM and the transmission of the response signal corresponds to that of the processing in the second radio apparatus 10b.

As a receiving operation, the radio unit 20 carries out frequency conversion of radiofrequency signal received by the antenna 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radiofrequency packet signals from the antenna 12. A PA (Power Amplifier) and a D-A conversion unit are also included. It is assumed herein that the time-domain signal 200 is a multicarrier signal which has been converted to the time domain and is a digital signal.

As a receiving operation, the baseband processing unit 22 converts the time-domain signals 200 into the frequency domain and performs adaptive array signal processing on the thus converted frequency-domain signals. That is, the baseband processing unit 22 performs FFT on the baseband signal so as to generate the frequency-domain signal 202 composed of a plurality of subcarriers as shown in FIG. 1. If the communication system 100 is a legacy system, the number of subcarriers will be "52". However, for the clarity of the figure, this is herein indicated by a single straight line. As a transmission operation, the baseband processing unit 22 inputs, from the modem unit 24, the frequency-domain signals 202 serving as signals in the frequency domain, and converts the frequency-domain signals into time domain. The baseband processing unit 22 performs IFFT on the frequency-domain signal 202. The baseband processing unit 22 outputs the frequency-domain signal 202 to the radio unit 20.

As a receiving processing, the modem unit 24 demodulates the frequency-domain signal 202 outputted from the baseband processing unit 22. The demodulation is carried out per subcarrier. The modem unit 24 outputs the demodulated signal to the IF unit 26. As a transmission processing, the modem unit 24 carries out modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 performs decoding after deinterleaving the signals from a plurality of modem units 24. The IF unit 26 outputs the decoded data. As a transmission processing, the IF unit 26 inputs data, then codes it and, thereafter, interleaves the coded data. Then the IF unit 26 outputs the interleaved data to the modem unit 24. When the transmission processing is carried out, the coding rate is specified by the control unit 30. Here, an example of the coding is convolutional coding, whereas an example of decoding is Viterbi decoding.

The control unit 30 controls an operation of the first radio apparatus 10a. For example, the control unit 30 generates a request signal and has this request signal sent to the not-shown second radio apparatus 10b via the IF unit 26, the modem unit 24, the baseband processing unit 22, the radio unit 20 and the antenna 12. The control unit 30 receives a response signal from the second radio apparatus 10b via the antenna 12, the radio unit 20, the baseband processing unit 22, the modem unit 24 and the IF unit 26. As described earlier, the response signal contains channel characteristics having components corresponding respectively to a plurality of subcarriers and EVM. The control unit 30 computes correlation values of components for the channel characteristics among the subcarriers. The correlation values are derived using a known technique. Note that the correction value corresponds to a delay characteristic such as a delay spread. For example, when the delay spread becomes smaller, the correlation value becomes larger; and when the delay spread becomes larger, the correlation value becomes smaller. Since the number of subcarriers is "56" in the case of FIG. 1, "55" correlation values are derived. The control unit 30 sums up these correlation values. This summation result will also be called "correlation value" herein.

Figure 5:
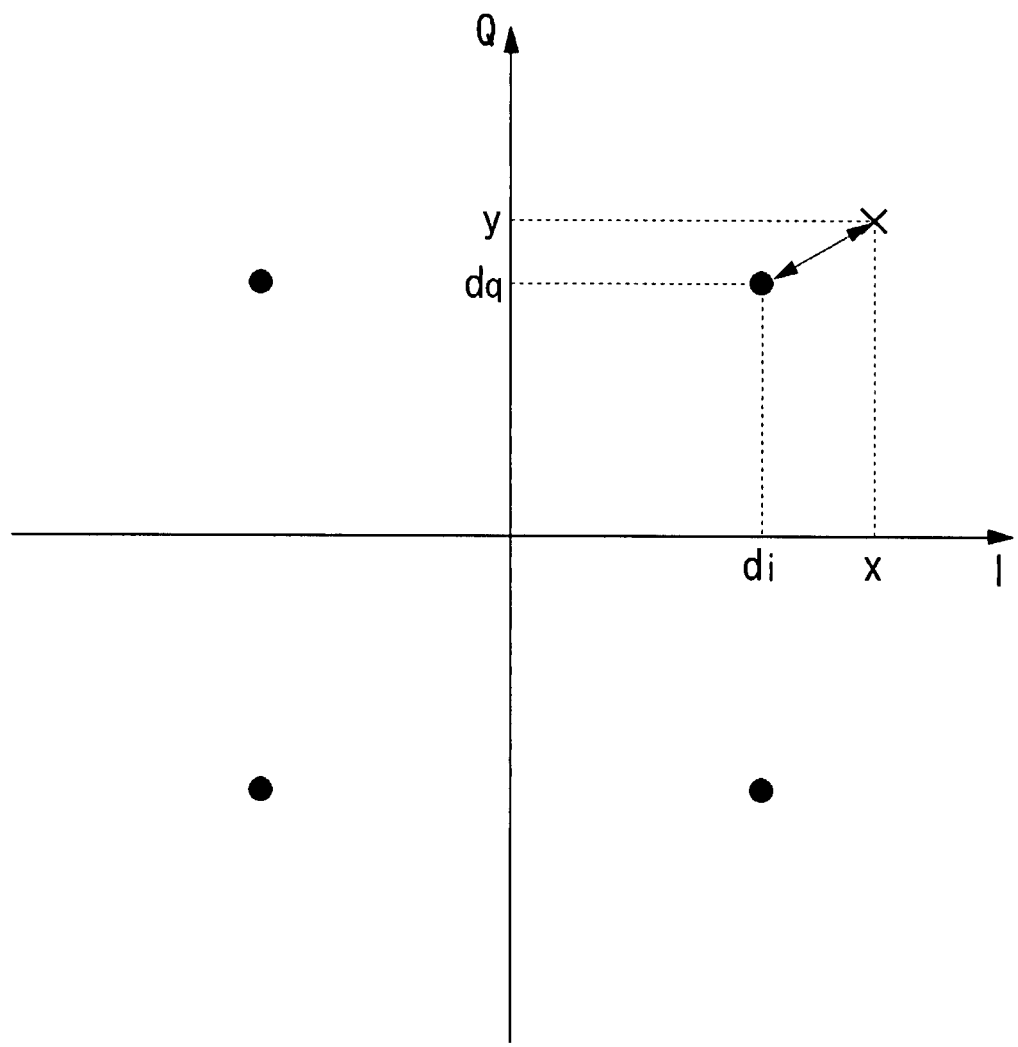
FIG. 5 shows an outline of EVM derived in a control unit shown in FIG. 4.

The control unit 30 acquires EVM. EVM is a physical quantity that indicates a difference between an ideal waveform and a measured waveform, and is also called error vector. FIG. 5 shows an outline of EVM acquired in the control unit 30. FIG. 5 shows a constellation in the case when the modulation scheme is QPSK. The horizontal axis corresponds to a real axis (I axis), whereas the vertical axis corresponds to an imaginary axis (Q axis). Circular dots represent ideal signal points, whereas an x-mark represents a signal point of a signal received by the second radio apparatus 10b. If the coordinates of the ideal signal point is expressed by (di, dq) and those of the signal point of the received signal is expressed by (x, y), EVM will be expressed by the following equation (1).

$$EVM=(x-di)^2+(y-dq)^2 \quad (1)$$

The above-described EVM is derived on a subcarrier-by-subcarrier basis. EVM derived by the control unit 30 in the second radio apparatus 10b is a value obtained in a manner such that EVMs derived for all of the subcarriers are averaged over one OFDM symbol. Here, the averaged result is also called "EVM". Now refer back to FIG. 4. By performing the above-described processing, the control unit 30 acquires the delay characteristics of a radio channel between the first radio apparatus 10a and the second radio apparatus 10b, and the error vector introduced by the radio channel.

The control unit 30 predefines the relation between the modulation scheme and the coding rate for EVM and correlation values, and determines the modulation scheme and the coding rate, based on the derived EVM and correlation values, by referring to this relation. More specifically, the control unit 30 defines a "threshold value for the correlation values" in order to relate the correlation values with the coding rates. The control unit 30 also defines a "threshold value for EVM" in order to relate EVM with the modulation scheme. That is, a decision is made so that coding rate values differ depending on whether the correlation value is greater than or equal to the "threshold value for the correlation values" or less than the "threshold value for the correlation values". The same is true for EVM and the modulation scheme. Note that the "threshold value for the correlation values" and the "threshold value for EVM" may each be so defined as to have a plurality of stages therefor. By performing the above-described processing, the control unit 30 determines the communication rate, based on the correlation values and EVM. The modem unit 24 uses the determined modulation scheme, and the IF unit 26 uses the determined coding rate. Thereby, the first radio apparatus 10a transmits data signals to the not-shown second radio apparatus 10b.

Of functions of the second radio apparatus 10b, a function to receive the request signal from the first radio apparatus 10a and transmit the response signal to the first radio apparatus 10b is explained here. The baseband processing unit 22 in the second radio apparatus 10b outputs the frequency-domain signal 202 to the modem unit 24 and, at the same time, outputs it to the control unit 30 as well. The above-described multi-carrier signals constitute a packet signal, and a known signal is assigned to an anterior area of the packet signal (hereinafter this known signal will be referred to as "training signal"). The control unit 30 stores the training signal per subcarrier, and performs correlation processing on the frequency-domain signal 202 and the training signal per subcarrier. A plurality of correlation results derived in this manner corresponds to the channel characteristics. The control unit 30 derives EVM as illustrated in FIG. 5, based on the signals received by the modem unit 24. Further, the second radio apparatus 10b generates a response signal that contains the channel characteristics and EVM.

In terms of hardware, this structure can be realized by a CPU, a memory of an arbitrary computer and other LSIs. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 6:
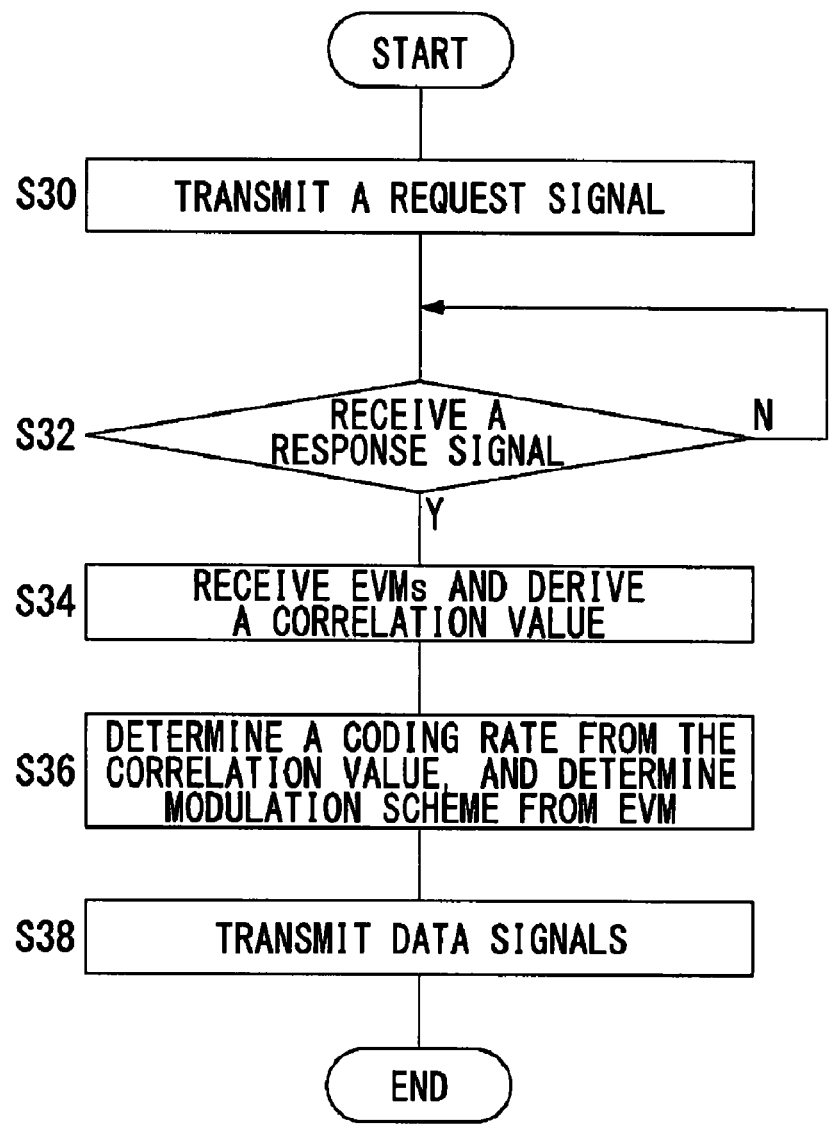
FIG. 6 is a flowchart showing a procedure for setting the communication rate in a first radio apparatus shown in FIG. 2.

An operation of the first radio apparatus structured as above is now described. FIG. 6 is a flowchart showing a procedure for setting the communication rate in the first radio apparatus 10a. The modem unit 24 and the like transmit a request signal (S30). The control unit 30 stands ready until the modem unit 24 and the like receive the response signal (N of 32). When the modem unit 24 and so forth receive the response signal (Y of S32), the control unit 30 receives EVM and derives correlation values (S34). The control unit 30 determines a coding rate from the correlation values, and determines the modulation scheme from EVM (S36). The IF unit 26 uses the determined coding rate, and the modem unit 24 uses the determined modulation scheme, and the modem unit 24 and the like transmit data signals (S38).

A modification is now described hereinbelow. In the processings by the communication system 100 according to a modification, the processing up to a stage where the first radio apparatus 10a receives the response signal transmitted from the second radio apparatus 10b is the same as that described in the exemplary embodiment. However, in the communication system 100 according to the modification, the request signal is a signal by which to request the EVM, and the response signal contains the EVM only. Although in the exemplary embodiment the correlation values and EVMs are used to determine the communication rate, the average value of EVMs and the variance value of EVMs are used in this modification. The communication system 100 according to the modification is of the same type as the communication system 100 shown in FIG. 2, whereas the first radio apparatus 10a according to the modification is of the same type as the first radio apparatus 10a shown in FIG. 4.

Here, the control unit 30 in the second radio apparatus 10b computes EVM of channel characteristics for each component corresponding to a subcarrier. Similar to the exemplary embodiment, the control unit 30 drives an average value of EVMs over one OFDM symbol. Further, the control unit 30 derives a variance value of EVMs from EVM for each component corresponding to a subcarrier and the average value of EVMs. A known technique may be used to derive the variance value and therefore the description thereof is omitted here. The second radio apparatus 10b transmits the response signal which contains the average value of EVMs and the variance value of EVMs.

The control unit 30 in the first radio apparatus 10a determines the communication rate from the average value of EVMs and the variance value of EVMs. More concretely, the control unit 30 determines the coding rate based on the variance value of EVMs and determines the modulation scheme based on the average value of EVMs. As for the processing for determining the coding rate and the modulation scheme, the processing described in the exemplary embodiment may be usable if "EVM" in the exemplary embodiment is replaced by the "average value of EVMs" and the "correlation value" in the exemplary embodiment is replaced by the "variance value of EVMs".

Figure 7:
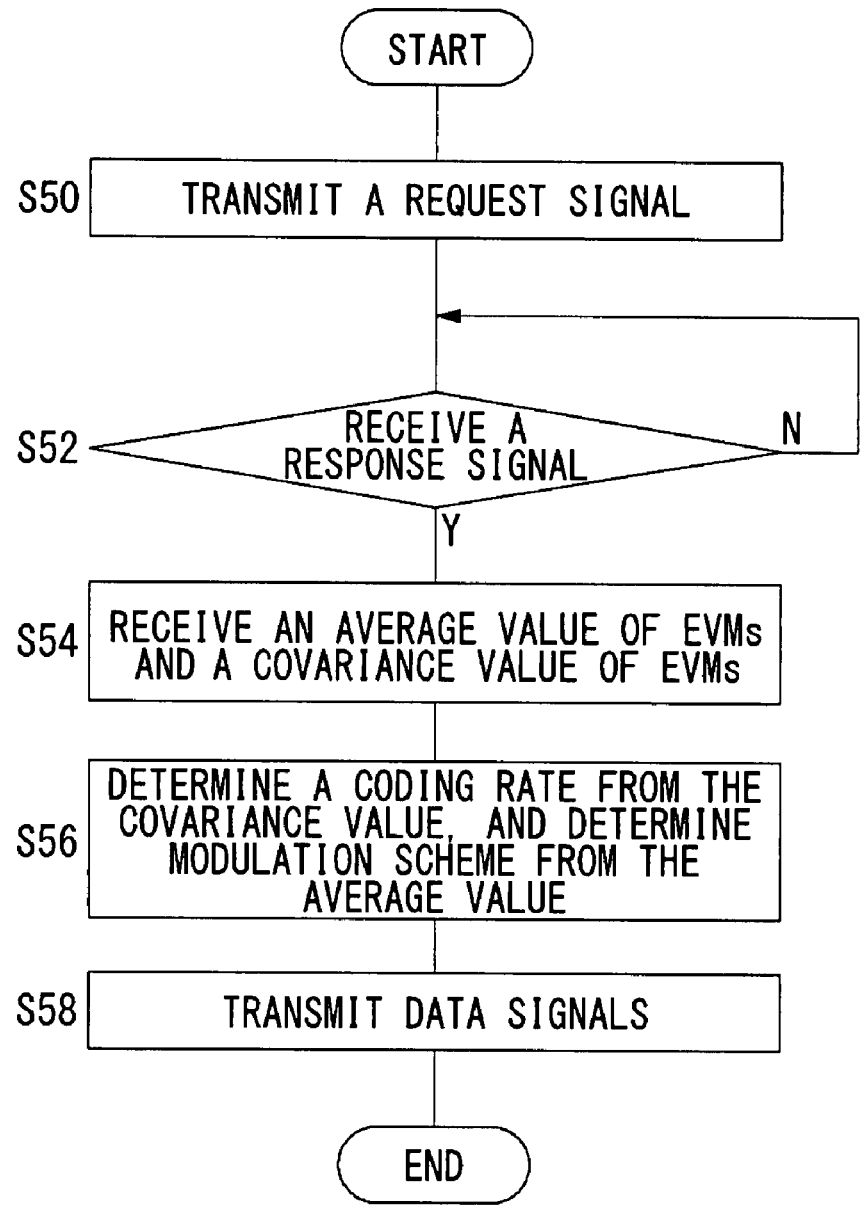
FIG. 7 is a flowchart showing a procedure for setting the communication rate according to a modification of an exemplary embodiment.

An operation of the first radio apparatus 10a structured as above is now described. FIG. 7 is a flowchart showing a procedure for setting the communication rate according to a modification of the exemplary embodiment. The modem unit 24 and the like sends a request signal (S50). The control unit 30 stands ready until the modem unit 24 and the like receive the response signal (N of 52). When the modem unit 24 and the like receive the response signal (Y of S52), the control unit 30 receives the average value of EVMs and the variance value of EVMs (S54). The control unit 30 determines a coding rate from the average value, and determines the modulation scheme from the variance value (S56). The IF unit 26 uses the determined coding rate, and the modem unit 24 uses the determined modulation scheme, and the modem unit 24 and the like transmit data signals (S58).

Another modification of the exemplary embodiment extends the adaptive modulation scheme in the legacy system which has been described in the above exemplary embodiment, to a MIMO system. That is, in this modification, communications by use of a plurality of streams are performed by setting the communication rate variably. Here, in order to derive the channel characteristics by a terminal apparatus, the base station apparatus transmits training signals by including the request signal therein. In the following description, a packet signal to which a training signal is assigned is also called the "training signal". Upon receipt of the training signals, the terminal apparatus estimates the channel characteristics between a plurality of antennas in the base station apparatus and those in the terminal apparatus per subcarrier contained in the MIMO system. Accordingly, a channel characteristic corresponding to each subcarrier is expressed by a matrix (hereinafter referred to as "H matrix") whose row components and column components correspond respectively to the number of antennas included in the terminal apparatus and that included in the base station apparatus. The terminal apparatus transmits the H matrix by containing it in the response signal.

The base station apparatus performs singular value decomposition on an H matrix so as to derive a plurality of singular values. From among a plurality of singular values, the base station apparatus selects those having such magnitudes to the degree that the signals can be transmitted. Then the base station apparatus selects a minimum singular value from the thus selected signal values (hereinafter simply referred to as "minimum singular value"). The base station apparatus also selects a maximum singular value. The base station apparatus derives a difference between the maximum singular value and the minimum singular value. As a result of the above-described processing, the base station apparatus determines the communication rate, based on the minimum singular value and the differences among the singular values.

Figure 8:
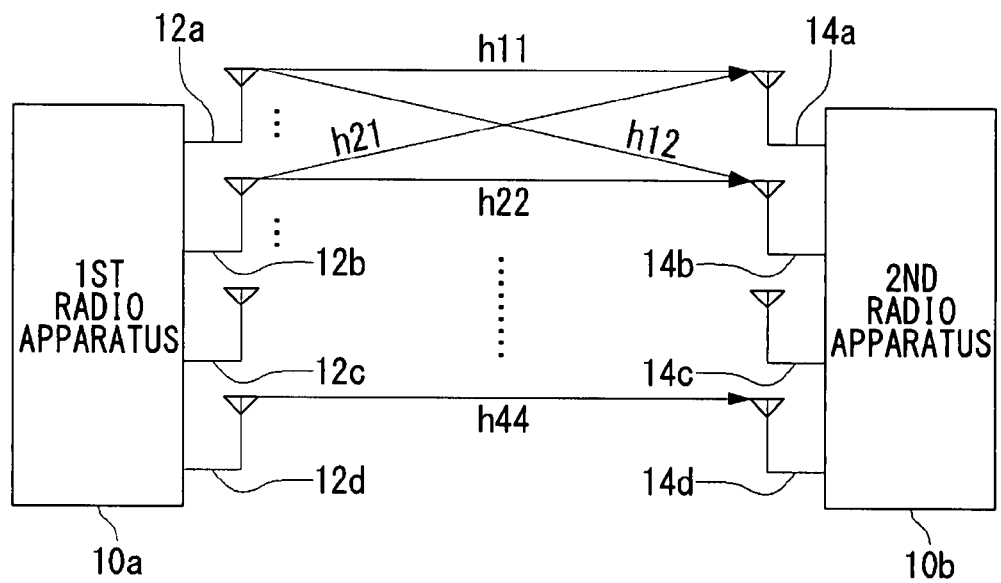
FIG. 8 illustrates a structure of a communication system according to another exemplary embodiment of the present invention.

FIG. 8 illustrates a structure of a communication system 100 according to another exemplary embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12". The second radio apparatus 10b includes a first antenna 14a, a second antenna 14b, a third antenna 14c and a fourth antenna 14d, which are generically referred to as "antennas 14". Here, the first radio apparatus 10a corresponds to a base station apparatus, whereas the second radio apparatus 10b corresponds to a terminal apparatus.

An outline of a MIMO system will be explained before the description of a structure of the communication system 100. Assume herein that data are being transmitted from the first radio apparatus 10a to the second radio apparatus 10b. The first radio apparatus 10a transmits respectively data signals composed of multiple streams from the first antenna 12a through the fourth antenna 12d, respectively. As a result, the data rate becomes higher. The second radio apparatus 10b receives the data signals composed of multiple streams by the first antenna 14a through the fourth antenna 14d.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 8, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 8. The training signal is transmitted from the first radio apparatus 10a to the second radio apparatus 10b. Note that the roles of the first radio apparatus 10a and the second radio apparatus 10b may be reversed.

FIGS. 9A to 9C each illustrate a packet format for the communication system 100. FIGS. 9A to 9C do not show the training signals but the format of normal packet signals. Here, FIG. 9A corresponds to the case where the number of streams is "4"; FIG. 9B corresponds to the case where the number of streams is "3"; and FIG. 9C corresponds to the case where the number of streams is "2". In FIG. 9A, data contained in four streams are to be transmitted, and the packet formats corresponding to the first stream to the fourth stream are shown, in order, from the top to the bottom, respectively.

In the packet signal corresponding to the first stream, "L-STF", "HT-LTF" and the like are assigned as preamble signals. "L-STF", "L-LTF", "L-SIG" and "HT-SIG" are a known signal for AGC setting, a known signal for channel estimation and a control signal compatible with legacy system, and a control signal compatible with MIMO system, respectively. The control signal compatible with MIMO system, for example, contains information on the number of streams and a destination of data. "HT-STF" and "HT-LTF" are a known signal for AGC setting and a known signal, for channel estimation, compatible with a MIMO system, respectively. "Data 1" is a data signal. Note that L-LTF and HT-LTF are used not only for AGC setting but also for timing estimation.

In the packet signal corresponding to the second stream, "L-STF(–50 ns)", "HT-LTF(–400 ns)" and the like are assigned as preamble signals. In the packet signal corresponding to the third stream, "L-STF(–100 ns)", "HT-LTF(–200 ns)" and the like are assigned as preamble signals. In the packet signal corresponding to the fourth stream, "L-STF(–150 ns)", "HT-LTF(–600 ns)" and the like are assigned as preamble signals.

Here, "–400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(–50 ns)" is "L-STF" given a cyclic timing shift by a delay of –50 ns. Assume herein that L-STF and HT-STF are each structured by a repetition of an 800 ns duration and that the other parts such as HT-LTF are each constituted by a repetition of a 3.2 μs GI area. Here, the CDD is also applied to "Data 1" to "Data 4" and the amounts of timing shift are of the same values as those for HT-LTFs assigned anterior thereto.

In the first stream, HT-LTFs are assigned in the order of "HT-LTF", "–HT-LTF", "HT-LTF" and "–HT-LTF" from the top. Here, these in this order are called "a first component", "a second component", "a third component" and "a fourth component" in all of the streams. A receiving apparatus extracts a desired signal for the first stream by computing "first component minus (–) second component plus (+) third component minus (–) fourth component" for received signals of all the streams. The receiving apparatus extracts a desired signal for the second stream by computing "first component+second component+third component+fourth component" for received signals of all the streams. Also, the receiving apparatus extracts a desired signal for the third stream by computing "first component–second component–third component+fourth component" for received signals of all the streams. Also, the receiving apparatus extracts a desired signal for the fourth stream by computing "first component+second component–third component–fourth component" for received signals of all the streams. These correspond to the fact that the combination of the signs of predetermined components has an orthogonal relationship among the streams. Note that the addition and subtraction processing are done by vector operation.

Similar to the legacy system, "52" subcarriers are used for the fields starting from "L-LTF" up to "HT-SIG" and the like. Of "52" subcarriers, "4" subcarriers correspond to pilot signals. Fields from "HT-LTF" onward use "56" subcarriers.

In FIG. 9A, the sign of "HT-LTF" is defined as follows. The signs are arranged in order from the top of the first stream as "+ (plus)", "– (minus)", "+" and "–"; the signs are arranged in order from the top of the second stream as "+", "+", "+" and "+"; the signs are arranged in order from the top of the third stream as "+", "–", "–" and "+"; and the signs are arranged in order from the top of the fourth stream as "+", "+", "–" and "–". However, the signs may be defined as follows. That is, the signs are arranged in order from the top of the first stream as "+", "–", "+" and "+"; the signs are arranged in order from the top of the second stream as "+", "+", "–" and "+"; the signs are arranged in order from the top of the third stream as "+", "+", "+" and "–"; and the signs are arranged in order from the top of the fourth stream as "–", "+", "+" and "+". In such signs, too, the orthogonal relationship holds in the combination of signs of predetermined components.

FIG. 9B corresponds to the first stream through the third stream of FIG. 9A. FIG. 9C is similar to the first stream and second stream of the packet formats shown in FIG. 9A. Here, the assignment of "HT-LTFs" in FIG. 9B differs from that of "HT-LTFs" in FIG. 9A. That is, the first components and the second components only are contained in HT-LTFs. In the first stream, HT-LTFs are assigned in the order of "HT-LTF" and "HT-LTF" from the top, whereas in the second stream they are assigned in the order of "HT-LTF" and "–HT-LTF". A receiving apparatus extracts a desired signal for the first stream by computing "first component+second component" for received signals of all the streams. Also, the receiving apparatus extracts a desired signal for the second stream by computing "first component–second component" for received signals of all the streams. In this case, too, the orthogonal relationship holds as described earlier. For example, the packet signals as shown in FIGS. 9A to 9C may be transmitted from the first radio apparatus 10a while they undergo beamforming.

Figure 10A:
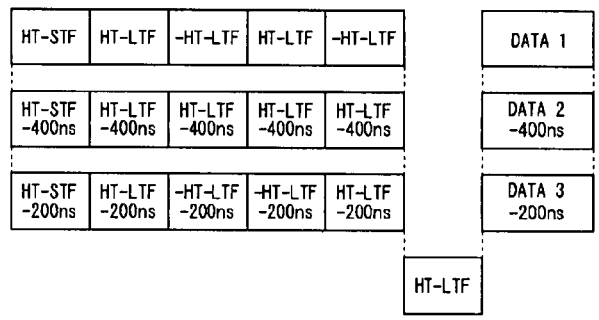
FIGS. 10A to 10D illustrate packet formats for use with training signals in the communication system shown in FIG. 8.
Figure 10B:
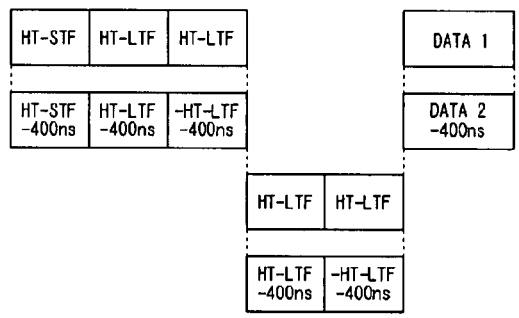
Figure 10C:
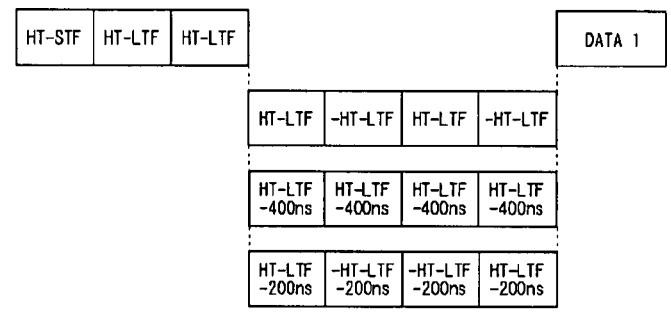
Figure 10D:
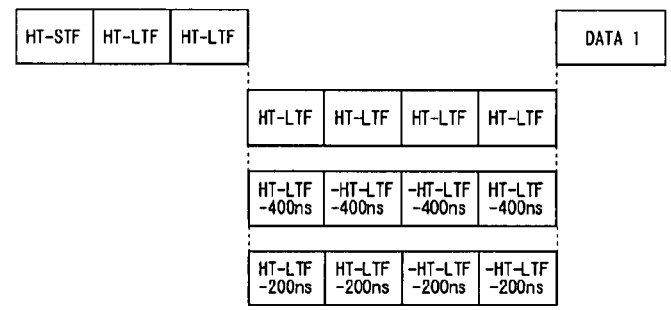

FIGS. 10A to 10D illustrate packet formats for use with training signals in the communication system 100. FIGS. 10A to 10D show training signals for packet signals corresponding to FIG. 9B, FIG. 9C and cases where data is assigned to one stream alone, respectively. For clarity, "L-STF" to "HT-SIG" contained in a packet format are omitted here. That is, a structure from "HT-STF" onward is shown here. FIG. 10A represents a case where the number of streams to which a data signal is assigned (hereinafter this stream will be referred to as "main stream") is "3". FIG. 10B represents a case where the number of main streams is "2". FIGS. 10C and 10D represents a case where the number of main streams is "1". That is, a data signal is assigned to each of the first stream to the third stream in FIG. 10A; a data signal is assigned to each of the first stream and the second stream in FIG. 10B; and a data signal is assigned to the first stream.

The assignment up to HT-LTF in the first stream to the third stream in FIG. 10A is the same as that of FIG. 9B. In a position posterior thereto, however, a blank duration is provided in the first stream to the third stream. In the fourth stream, on the other hand, HT-LTF is assigned to the position corresponding to the blank duration in the first to third streams. Following the HT-LTF assigned in the fourth stream, Data are assigned to the first to third streams. One HT-LTF is assigned in the fourth stream.

The assignment as described above makes the number of streams to which "HT-STF" is assigned equal to the number of streams to which a data signal is assigned, so that the error contained in the gain set by "HT-STF" becomes small at a receiving apparatus, thus preventing the worsening of data signal receiving characteristics. Also, the "HT-LTF" assigned to the fourth streams is only assigned to a single stream. Thus, the possibility where "HT-LTF" assigned to the fourth stream in the receiving apparatus is amplified to such an extent that the distortion is caused by AGC can be reduced. Hence, the deterioration in the accuracy of channel estimation can be prevented.

The assignment up to HT-LTF in the first stream and the second stream in FIG. 10B is the same as that of FIG. 9C. In a position posterior thereto, however, a blank duration is provided in the first stream and the second stream. In the third stream and the fourth stream, on the other hand, HT-LTFs are assigned to the position corresponding to the blank duration in the first and second streams. Following the HT-LTF assigned in the third and fourth streams, Data are assigned to the first and second streams. The assignment of HT-LTFs in the third and fourth streams are the same as that in FIG. 9C.

Here it is assumed that the degrees of priority for the amounts of timing shift are defined in the descending order of "0 ns", "−400 ns", "−200 ns" and "−600 ns". In other words, "0 ns" has the highest degree of priority, and "−600 ns" the lowest. Accordingly, the values of "0 ns" and "−400 ns" are used as the timing shift amounts in the first and second streams. In the third and fifth streams, the values of "0 ns" and "−400 ns" are also used as the timing shift amounts. As a result, the combination of "HT-LTF" and "HT-LTF" in the first stream is also used in the third stream, and the combination of "HT-LTF (−400 ns)" and "−HT-LTF (−400 ns)" in the third stream is also used in the fourth stream, thus making the processing simpler.

The assignment up to HT-LTF in the first stream in FIG. 10C is the same as that in the first stream of FIG. 10B. Here, two "HT-LTFs" are assigned.

In a position posterior thereto, however, a blank duration is provided in the first stream. In the second to fourth streams, on the other hand, HT-LTFs are assigned to the position corresponding to the blank duration in the second to fourth streams. Following the HT-LTFs assigned in the second to fourth streams, Data is assigned to the first stream. The assignment of HT-LTFs in the second and third streams are similar to that in FIG. 9B.

The packet format of FIG. 10D is structured the same way as with FIG. 10C. However, the combination of the signs of "HT-LTF" in FIG. 10D differs from that in FIG. 10C. Here, the combination of the signs of "HT-LTFs" is defined so that an orthogonal relationship will hold among the streams. Furthermore, in FIG. 10D, the combination of the signs of "HT-LTFs" is so defined as to be fixed for each of a plurality of streams. Similar to FIG. 10C, "0 ns", "−400 ns" and "−200 ns", which have higher degrees of priority, are used even in the second to fourth streams in FIG. 10D.

One "HT-LTF" is assigned to the fourth stream which is a stream where no data is assigned (hereinafter such a stream as this will be referred to as "sub-stream") in FIG. 10A. Two "HT-LTFs" are assigned to each of the third and fourth streams in FIG. 10B. Four "HT-LTFs" are assigned to each of the second to fourth streams in FIGS. 10C and 10D. Comparing these, it is found that the length of "HT-LTF" assigned to the sub-streams in FIGS. 10C and 10D is the longest. That is, as the number of main streams in packet signal where training signals are to be produced increases, the length of sub-stream will decrease and therefore the transmission efficiency improves. Note that the training signals are transmitted without being subjected to the beamforming.

FIGS. 11A to 11D illustrate another packet formats for training signals in a communication system shown 100. FIGS. 11A to 11D correspond to FIGS. 10A to 10D, respectively. In FIGS. 11A to 11D, the amounts of timing shift are defined by associating them with a plurality of streams. Here, the timing shift amount of "0 ns" is defined for the first stream; the timing shift amount of "−400 ns" is defined for the second stream; the timing shift amount of "−200 ns" is defined for third second stream; and the timing shift amount of "−600 ns" is defined for the fourth stream.

Figure 11A:
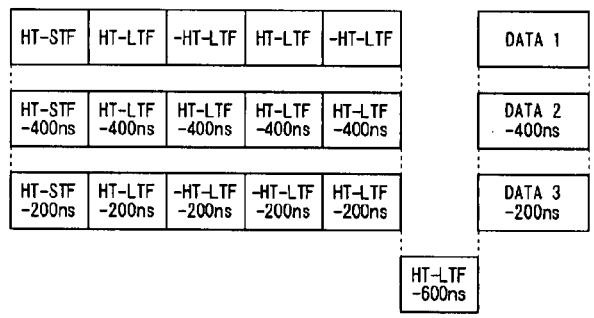
FIGS. 11A to 11D illustrate another packet formats for training signals in the communication system shown in FIG. 8.

Accordingly, the timing shift amounts of "−600 ns" is used in FIG. 11A, instead of the timing shift amount of "0 ns" in the fourth stream in FIG. 10A. The timing shift amounts of "−200 ns" and "−600 ns" are used in FIG. 11B, instead of the timing shift amounts of "0 ns" and "−400 ns" in the third and the fourth stream in FIG. 10B. On the other hand, the timing shift amounts of "−400 ns", "−200 ns" and "−600 ns" are used in FIGS. 11C and 11D, instead of the timing shift amounts of "0 ns", "−400 ns" and "−200 ns" in the second to the fourth stream in FIGS. 10C and 10D.

Figure 11B:
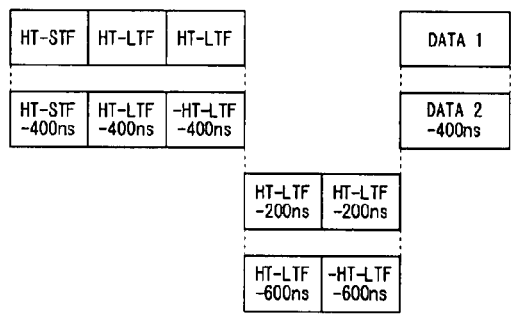
Figure 11C:
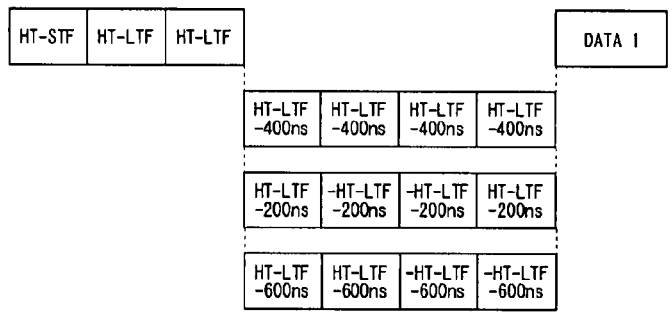
Figure 11D:
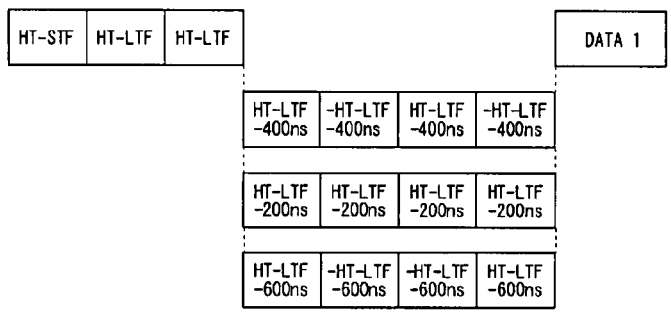

The packet format of FIG. 11D is structured the same way as that of FIG. 11C. However, the combination of the signs of "HT-LTF" in FIG. 11D differs from that in FIG. 11C. The combinations of the signs of "HT-LTF" are given degrees of priority beforehand. That is, the degrees of priority are defined so that the combination of signs in the first stream of FIG. 9A will have the highest degree of priority and that in the fourth stream thereof the lowest. For streams to which a data signal is assigned, the combinations of signs are used in order from one with the highest degree of priority. Also, for streams to which a data signal is not assigned, the combinations of signs are used in order from one with the highest degree of priority. In this manner, the combinations of signs are set the same way as with the both cases. Hence, when the receiving apparatus retrieves the respective components by performing + (plus) and − (minus) operations, a common circuit can be used in both of the calculation of channel characteristics for the part of "HT-LTF" in streams to which Data is not assigned and the calculation of channel characteristics for the part of "HT-LTF" in streams to which Data is assigned.

FIG. 12 shows packet formats of a packet signal that is finally transmitted in the communication system 100. FIG. 12 corresponds to a modified version of a packet signal of FIG. 10B and FIG. 11B. An operation by an orthogonal matrix, which will be discussed later, is carried out on "HT-STF" and "HT-LTF", which are assigned to the first and second streams of FIG. 10B and FIG. 11B. As a result, "HT-STF1" to "HT-STF4" are generated. The same applies to "HT-LTF" as well. Furthermore, CDD is applied to each of the first to fourth streams by their respective timing shift amounts of "0 ns", "−50 ns", "−100 ns" and "−150 ns". Note that the absolute value of timing shift amount in the second CDD is so set as to be smaller than the absolute value of timing shift amount in the first CDD for HT-STF and HT-LTF. A similar processing is performed on "HT-LTF" assigned to the third and fourth streams, and "Data 1" and the like assigned to the first stream.

Figure 13:
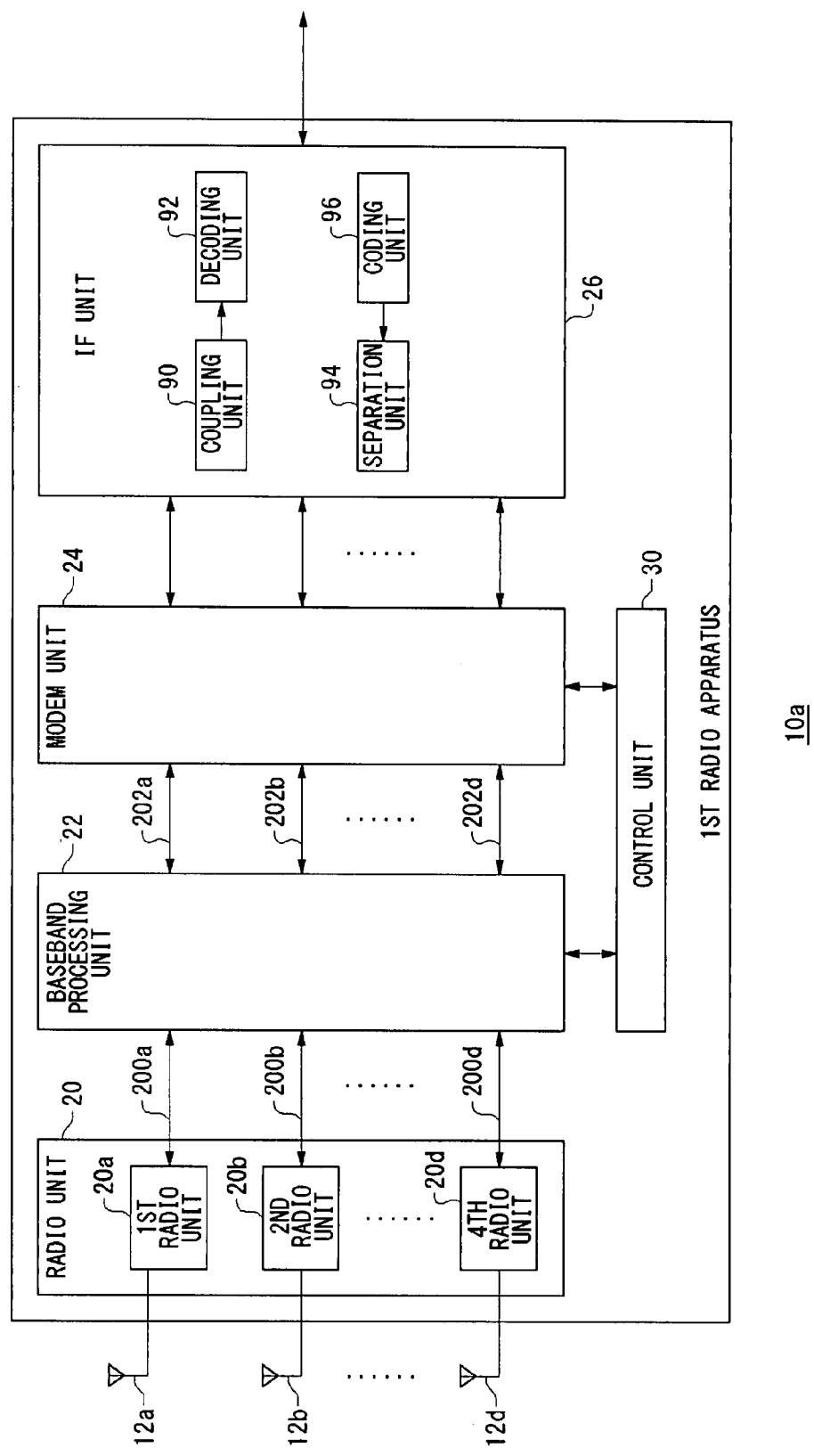
FIG. 13 illustrates a structure of a radio apparatus shown in FIG. 8.

FIG. 13 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. The IF unit 26 includes a coupling unit 90, a decoding unit 92, a separation unit 94 and a coding unit 96. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. The first radio apparatus 10a communicates with the not-shown second radio apparatus 10b having a plurality of antennas 14.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. Each frequency-domain signal 202 corresponds to each stream in a plurality of streams transmitted. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively with a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 14:
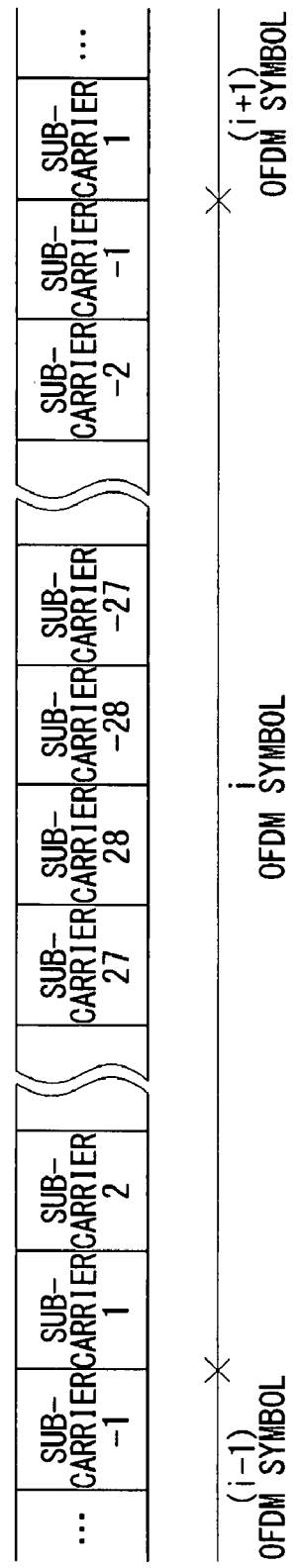
FIG. 14 illustrates a structure of a frequency-domain signal shown in FIG. 13.

FIG. 14 illustrates a structure of a frequency-domain signal. Assume herein that a combination of subcarrier numbers "–28" to "28" shown in FIG. 1 constitutes an "OFDM symbol". An "i"th OFDM symbol is such that subcarriers components are arranged in the order of subcarrier numbers "1" to "28" and subcarrier numbers "–28" to "–1". Assume also that an "(i–1)"th OFDM symbol is placed before the "i"th OFDM symbol, and an "(i+1)"th OFDM symbol is placed after the "i"th OFDM symbol. Note that, in "L-SIG" or the like shown in FIG. 9A and so forth, a combination of "–26" to "26" is used for one "OFDM symbol".

Now refer back to FIG. 13. To produce the packet formats corresponding to FIGS. 10A to 10D and FIGS. 11A to 11D, the baseband processing unit 22 included in the first radio apparatus 10a carries out CDD. Further, the baseband processing unit 22 performs the multiplication of a steering matrix to achieve a deformed or modified packet format as shown in FIG. 12. Such processing will be discussed later in detail. On the other hand, when the baseband processing unit 22 included in the second radio apparatus 10b receives a training signal, it derives an H matrix from the received training signal.

The H matrix has elements the number of which is determined by the number of a plurality of antennas 12 and the number of a plurality of antennas 14 (not shown here). If the number of a plurality of antennas 12 is "4" and that of antennas 14 is also "4" as shown in FIG. 8, the H matrix will be a 4×4 matrix for each subcarrier. Each component contained in the H matrix is the above-described channel characteristic and corresponds to $h_{ij}$ of FIG. 8. When transmitting a response signal to the first radio apparatus 10a, the baseband processing unit 22 has the H matrix contained in response signal. Here, the response signal has the packet formats shown in FIGS. 9A to 9C.

As a receiving processing, the modem unit 24 demodulates the frequency-domain signal 202 outputted from the baseband processing unit 22. The demodulation is carried out per subcarrier. The modem unit 24 outputs the demodulated signal to the IF unit 26. As a transmission processing, the modem unit 24 carries out modulation. The modem unit 24 outputs the modulated signal to the baseband processing unit 22 as a frequency-domain signal 202.

As a receiving processing, the IF unit 26 combines signals outputted from a plurality of modem units 24 and then forms one data stream. That is, the coupling unit 90 in the IF unit 26 combines the signals so as to form one stream. After deinterleaving one data stream, the decoding unit 92 in the IF unit 26 decodes the one data stream. The IF unit 26 outputs the decoded data stream. As a transmission processing, the IF unit 26 inputs one data stream, then codes and interleaves it by the coding unit 96 and, thereafter, separates the coded and interleaved data stream by the separation unit 98. Then the IF unit 26 outputs the thus separated data to the plurality of modem units 24.

The control unit 30 controls the timing and the like of the first radio apparatus 10a. A description is first given of an operation carried out in generating the training signals. The control unit 30 produces the packet signals of packet formats as shown in FIGS. 9A to 9C, FIGS. 10A to 10D, FIGS. 11A to 11D and FIG. 12, and performs a control to send the produced packet signals. Though a description is given here centering around the processing for producing the packet signals shown in FIG. 10B and FIG. 11B, the similar processing is also performed on the other packet formats.

Data to be assigned to at least one of a plurality of streams are inputted to the IF unit 26. As shown in FIG. 10B and FIG. 11B, data to be assigned to two streams are inputted here. The control unit 30 instructs the baseband processing unit 22 to generate packet signals from "HT-STFs" assigned to the two streams, namely the first and second streams, "HT-LTFs" assigned, in positions posterior to "HT-STF", to a plurality of streams, and data assigned to the first and second streams. The control unit 30 instructs the baseband processing unit 22 to the effect that "L-STF", "L-LTF", "L-SIG" and "HT-SIG" be assigned anterior to HT-STF as shown in FIGS. 9A to 9C.

A description is now given of a case where two "HT-LTFs" are assigned to one stream as shown in FIG. 10B and FIG. 11B. That is, the entire "HT-LTFs" are formed by repeating "HT-LTF" in the time domain. Also, the combination of signs of "HT-LTFs" is defined that the orthogonality will hold between main streams or between sub-streams. As a result, as described above, HT-LTF is extracted for the first stream if the first component and the second component are added up in a main stream. Also, HT-LTF is extracted for the second stream if the second component is subtracted from the first component in a main stream.

The number of "HT-LTFs" assigned to each stream is determined by the number thereof required for the orthogonality to hold. Accordingly, if the number of streams required for the orthogonal relationship to hold is "2", the number of "HT-LTFs" for each stream will be "2". If, on the other hand, the number of streams required for the orthogonality to hold is "3" or "4", the number of "HT-LTFs" for each stream will be "4".

The control unit 30 has the baseband processing unit 22 apply CDD to HT-LTF and the like. CDD means that HT-LTF assigned to one stream is used as a reference or benchmark and then HT-LTFs assigned to the other streams undergo timing shifts within HT-LTF. The control unit 30 sets up beforehand a degree of priority for the amounts of timing shift. Here, as described earlier, "0 ns" has the highest degree of priority, and following this the degrees of priority for the amounts of timing shift are defined in the descending order of "–400 ns", "–200 ns" and "–600 ns".

Further, the control unit 30 has the baseband processing unit 22 use the timing shift amounts in the descending order of degrees of priority for the main streams. For example, "0 ns" is used for the first stream and "−400 ns" is used for the second stream in the case of FIG. 10B. Also, the control unit 30 has the baseband processing unit 22 use the timing shift amounts in the descending order of degrees of priority for the substreams. For example, "0 ns" is used for the third stream and "−400 ns" is used for the fourth stream in the case of FIG. 10B. The above processing produces the packet signals having the packet format as shown in FIG. 10B.

Aside from this, mutually different values of timing shift amounts may be set respectively to a plurality of streams. For example, "0 ns" is set as the timing shift amount for the first stream; "−400 ns" is set as the timing shift amount for the second stream; "−200 ns" is set as the timing shift amount for the third stream; and "−600 ns" is set as the timing shift amount for the fourth stream. The above processing produces the packet signals of the packet format as shown in FIG. 11B.

With the above-described processing, after producing the packet signals of the packet format as shown in FIGS. 10A to 10D and FIGS. 11A to 11D, the control unit 30 has the baseband processing unit 22 modify or deform such packet signals as these. That is, the control unit 30 modifies or deforms the packet format as shown in FIG. 10B and FIG. 11B to the packet format as shown in FIG. 12. After extending the number of streams to the number of multiple streams, the baseband processing unit 22 applies CDD to the thus extended streams. The control unit 30 has the baseband processing unit 22 transmit the modified packet signals to the radio unit 20.

The control unit 30 has the baseband processing unit 22 and the like transmit the request signal. Note here that the request signal may be contained in a training signal or in a packet signal other than that contains the training signal. For the simplicity of explanation, it is assumed, as described earlier, that the request signal is contained in a training signal.

A description is now given of an operation of the control unit 30 included in the second radio apparatus 10b which is to receive a training signal containing the request signal. The control unit 30 has the baseband processing unit 22 derive an H matrix per subcarrier based on the received training signal. That is, while using HT-LTF contained in the received training signal and HT-LTF which has been stored beforehand, the baseband processing unit 22 derives the H matrix by correlation and the like therebetween. Also, the control unit 30 instructs the baseband processing unit 22 to transmit the response signal containing the H matrix, as described earlier.

A description is next given of an operation of the control unit 30 included in the first radio apparatus 10a which is to receive a response signal containing the H matrix. By receiving the H matrix the control unit 30 acquires channel characteristics between the first radio apparatus 10a and the second radio apparatus 10b, namely the physical quantity on the signal strength, per subcarrier. As described earlier, the H matrix is a channel matrix having components the number of which is determined by the number of antennas 14 wherein values of said components represent channel characteristics between a plurality of antennas 12 and a plurality of antennas 14, respectively. For the ease of explanation, a description is given hereinbelow of a processing performed on one subcarrier. The received training signal is denoted by a receiving signal vector X. Note that Y has components the number of which is equal to the number of antennas 14. Also, a training signal to be transmitted is denoted by a transmitting signal vector X. Note that X has components the number of which is equal to the number of antennas 12. With the definitions as above, the relationship among Y, X and the H matrix is expressed by the following Equation (2).

$$Y = HX + n \quad (2)$$

where n is a noise vector. H matrix has the number of rows equivalent to the number of antennas 12 and the number of columns equivalent to the number of antennas 14. In the case of FIG. 8, each component of H matrix is expressed by the following Equation (3).

$$H = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix} \quad (3)$$

The control unit 30 subjects H matrix to Singular Value Decomposition. The Singular Value Decomposition for H matrix is expressed by the following Equation (4).

$$H = U\Sigma V^H \quad (4)$$

where $\Sigma$ is a diagonal matrix expressed by the following Equation (5).

$$\Sigma = \mathrm{diag}[\sqrt{\lambda_1}, \Lambda, \sqrt{\lambda_m}] \quad (5)$$

In Equation (5), m corresponds to the number of channels set in a radio channel and may be the number of antennas 12 or the number of antennas 14 whichever is smaller than the other. Here, $\Sigma$ is a matrix of m rows and m columns, and the components thereof are singular values and are equivalent to gains in an eigenmode. U and V are singular matrices and are each a matrix of m rows corresponding to the number of the antennas 14 and m columns corresponding to the number of antennas 12. As a result of the above processing, the control unit 30 acquires a plurality of singular values.

The control unit 30 selects a minimum singular value and a maximum signal value from among the plurality of singular values. Here, since the minimum singular value corresponds to an eigenmode whose gain is small, this minimum singular value corresponds to a singular value which is to be compatible with a low communication rate, among the communication rates suitable for a plurality of streams, respectively. Also, the control unit 30 derives a difference between the maximum singular value and the minimum singular value. Further, the control unit 30 determines a combination of a communication rate (namely, modulation scheme) and a coding rate, based on the minimum singular value and the difference. For example, the control unit 30 determines the coding rate, based on the difference, and determines the modulation scheme, based on the minimum singular value. If "EVM" in the exemplary embodiment is replaced by the "minimum singular value" and the "correlation value" in the exemplary embodiment by the "difference", the processing in the exemplary embodiment can be used as a processing for determining the coding rate and the modulation scheme.

Note that the "minimum singular value" may be the nth largest singular value. Here, n corresponds to the maximum number of streams which corresponds to a common maximum number of streams compatible with the first radio apparatus 10a and the second radio apparatus 10b. For example, if the first radio apparatus 10a has four antennas 12 but the second radio apparatus 10b is compatible with two streams only, the modulation scheme and the like will be determined from the maximum number of streams compatible with both the first radio apparatus 10a and the second radio apparatus 10b in common (namely, the difference between the "second" singular value and the "first" singular value) and the magnitude of the second signal value.

In a system that executes the error-correction coding across a plurality of streams, the greater the difference is, the greater the effect of error correction will be. Accordingly, even if any of a plurality of singular values are identical to each other, the control unit 30 will use a faster communication rate as the difference becomes greater. Here, "use of a faster communication rate" means the use of a higher coding rate. Note that communication rate may be determined by any other different methods. For example, a relation is defined beforehand between a combination of the modulation scheme and the coding rate and each value that each combination of the minimum correlation value and a difference is to take. Then the control unit 30 may determine the combination of a modulation scheme and a coding rate from the respective combinations of a derived minimum correlation value and a difference.

Figure 15:
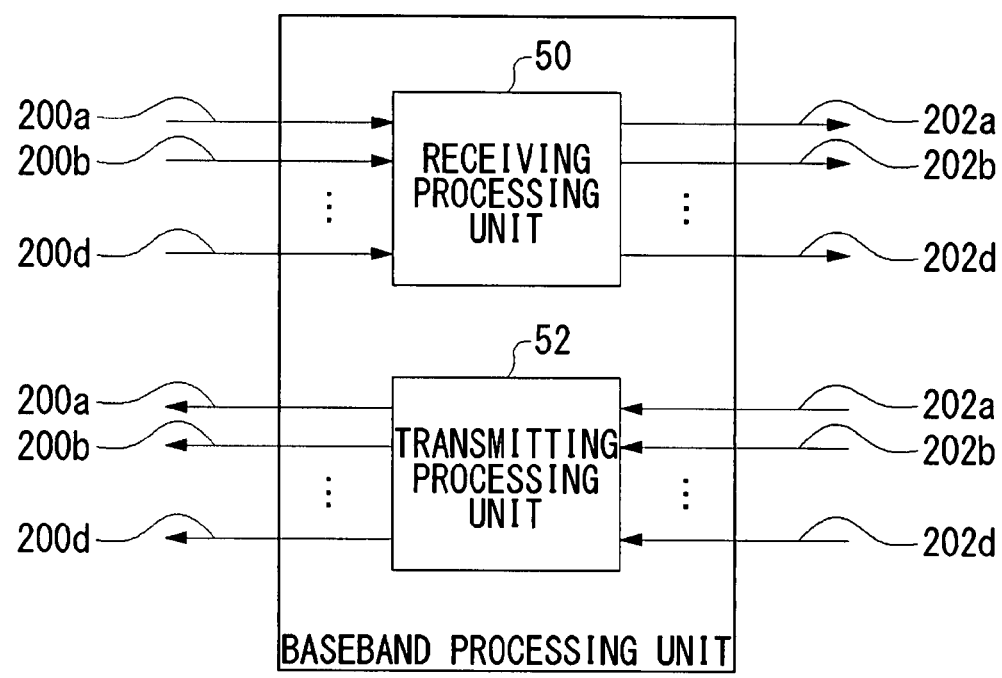
FIG. 15 illustrates a structure of a baseband processing unit shown in FIG. 13.

FIG. 15 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors of the time-domain signal 200. Also, the receiving processing unit 50 outputs the result of array synthesis as the frequency-domain signal 202. The receiving processing unit 50 estimates the above-described H matrix, based on the frequency-domain signal 202 corresponding to the training signal.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting unit 52 associates a plurality of streams with a plurality of antennas 12, respectively. The transmitting processing unit 52 applies CDD as shown in FIGS. 9A to 9C, FIGS. 10A to 10D and FIGS. 11A to 11D, and executes an operation using a steering matrix as shown in FIG. 12. The transmitting processing unit 52 outputs finally the time-domain signals 200. The transmitting processing unit 52 may perform beamforming on the packet signals shown in FIGS. 9A to 9C.

Figure 16:
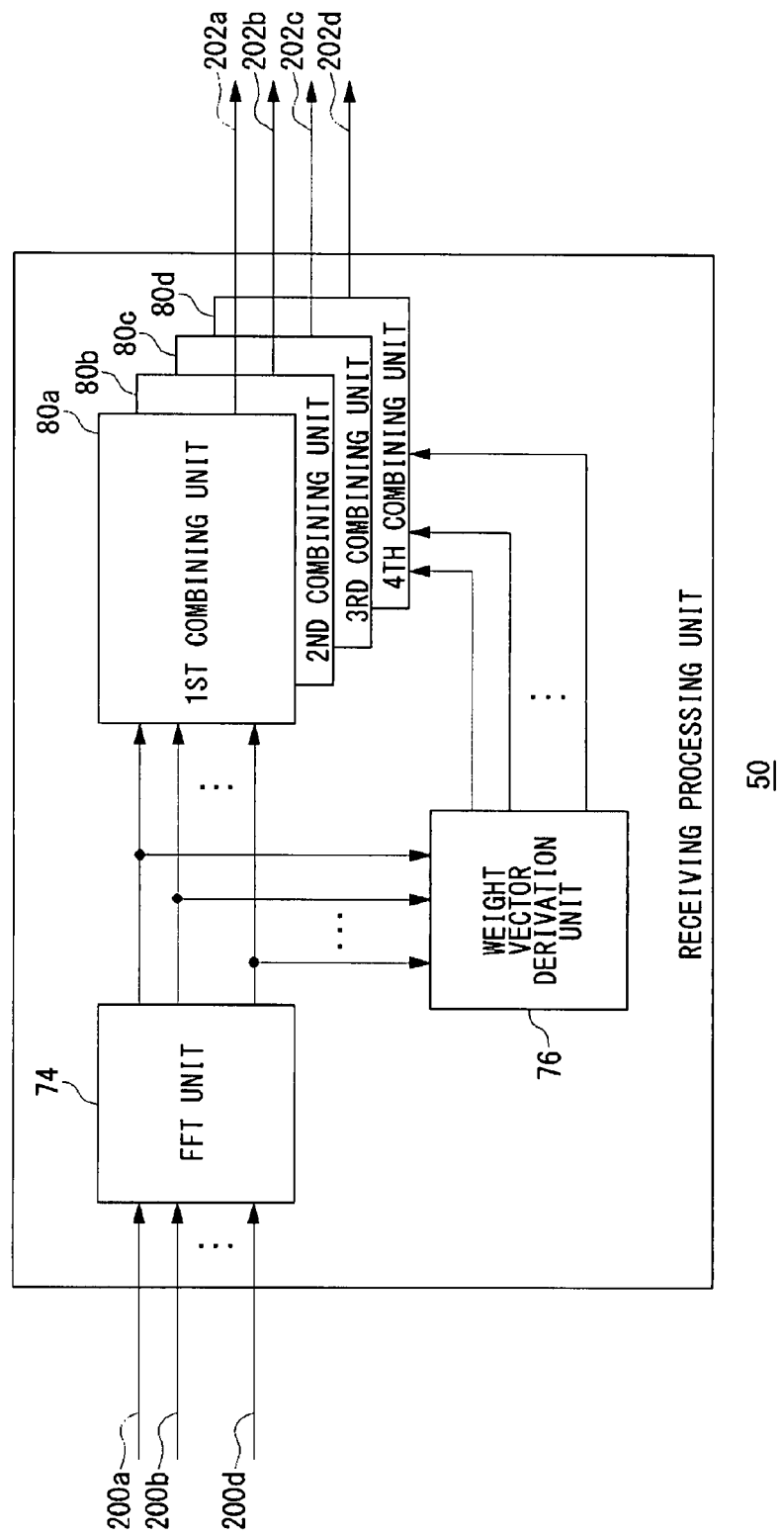
FIG. 16 illustrates a structure of a receiving processing unit shown in FIG. 15.

FIG. 16 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. Thus, it is assumed here that the frequency-domain value is structured as shown in FIG. 14. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. To derive a weight vector corresponding to a plurality of streams, an adaptive algorithm may be used or channel characteristics may be used. Since a known technique may be employed in such processings, the explanation thereof is omitted here. When deriving the weight vector, the weight vector derivation unit 76 executes an operation of the first component minus (−) the second component plus (+) the third component minus (−) the fourth component or the like, as described earlier. As described above, the weights are derived finally for each of subcarriers, antennas 12 and streams, respectively. The weight vector derivation unit 76 derives the above-described H matrix for each subcarrier as well as the weight vector.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight vector has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 17:
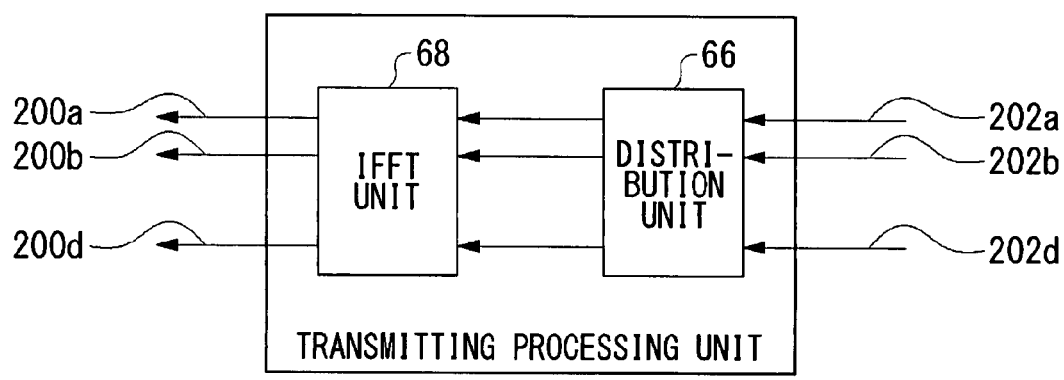
FIG. 17 illustrates a structure of a transmitting processing unit shown in FIG. 15.

FIG. 17 illustrates a structure of the transmitting processing unit 52. The transmitting processing unit 52 includes a distribution unit 66 and an IFFT unit 68. The distribution unit 66 associates the frequency-domain signals 202 with the antennas 12. A description is given here of a case where no beamforming is executed, for example, a processing performed when the training signal is transmitted. To produce the packet signals corresponding to FIGS. 9A to 9C, FIGS. 10A to 10D and FIGS. 11A to 11D, the distribution unit 66 carries out CDD. CDD is expressed as a matrix C in the following Equation (6).

$$C(\lambda) = \mathrm{diag}(1, \exp(-j2\pi\lambda\delta/N\mathrm{out}), \Lambda, \exp(-j2\pi\lambda\delta(N\mathrm{out}-1)/N\mathrm{out})) \quad (6)$$

where $\delta$ indicates a shift amount and $\lambda$ a subcarrier number. The multiplication of the matrix C by a stream is done on a subcarrier-by-subcarrier basis. That is, the distribution unit 66 carries out a cyclic time shifting within the L-STF and so forth per stream. The amount of timing shift is set as in FIGS. 9A to 9C, FIGS. 10A to 10D and FIGS. 11A to 11D.

The distribution unit 66 multiplies respectively the training signals produced, as in FIGS. 10A to 10D and FIGS. 11A to 11D, by a steering matrix so as to increase the number of streams for training signal up to the number of a plurality of streams. Before carrying out multiplication, the distribution unit 66 extends the degree of inputted signals to the number of a plurality of streams. In the case of FIG. 10B and FIG. 11B, "HT-STF" and the like assigned to the first and second streams are inputted, so that the number of signals inputted is "2", which will be represented by "Nin" here.

Accordingly, the inputted data are indicated by a vector of "Nin×1". The number of a plurality of streams is "4" and this is represented by "Nout" here. The distribution unit 66 extends the degree of inputted data to Nout from Nin. In other words, the vector of "Nin×1" is extended to the vector of "Nout×1". In so doing, "0" is inserted to components from the (Nin+1)th row to the Nout-th row. On the other hand, the component up to Nin are "0's" for "HT-LTF" assigned to the third and the fourth stream of FIG. 10B and FIG. 11B, and HT-LTF and the like are inserted into the components from (Nin+1)th row to the Nout-th row.

A steering matrix is expressed by the following Equation (7).

$$S(\lambda)=C(\lambda)W \tag{7}$$

The steering matrix is a matrix of "Nout×Nout". W is an orthogonal matrix of "Nout×Nout". An example of the orthogonal matrices is a Walsh Matrix. Here, $\lambda$ is the subcarrier number, and the multiplication by a steering matrix is done on a subcarrier-by-subcarrier basis. C denotes CDD as described above. Here, the amounts of timing shift are so defined as to differ for a plurality of streams, respectively. That is, the amounts of timing shift for the first to the fourth stream are defined to be, for example, "0 ns", "−50 ns" "−100 ns" and "−150 ns", respectively.

Figure 18:
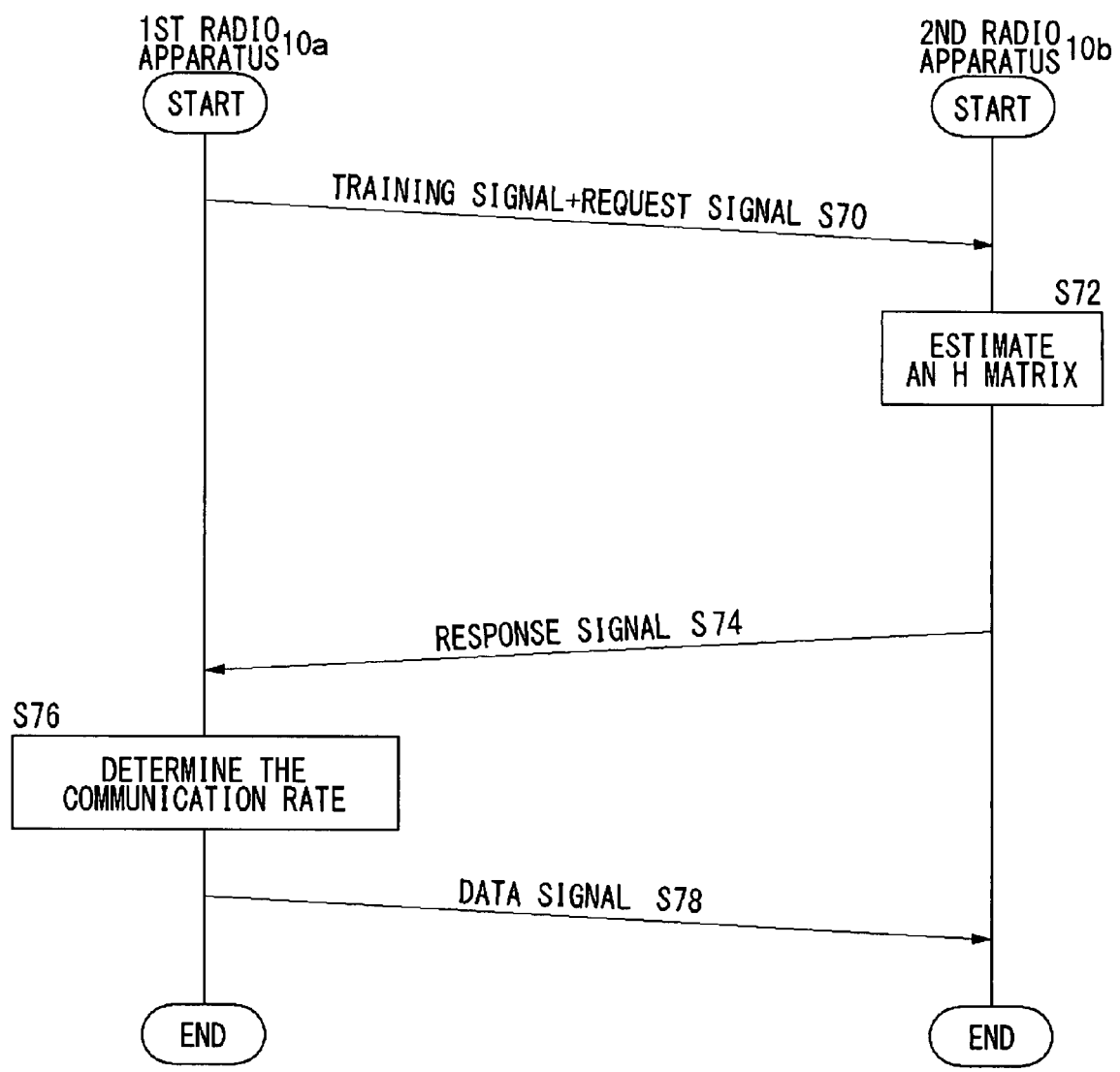
FIG. 18 is a sequence diagram showing a procedure for setting a communication rate in the communication system shown in FIG. 8.

An operation of the communication system 100 structured as above will now be described. FIG. 18 is a sequence diagram showing a procedure for setting the communication rate in the communication system 100. The first radio apparatus 10a transmits a training signal that contains a request signal, to the second radio apparatus 10b (S70). The second radio apparatus 10b estimates an H matrix, based on the training signal (S72). The second radio apparatus 10b transmits a response signal containing the H matrix, to the first radio apparatus 10a (S74). The first radio apparatus 10a determines the communication rate, based on the H matrix contained in the response signal (S76). While using the determined communication rate, the first radio apparatus 10a transmits data signals to the second radio apparatus 10b (S78).

Figure 19:
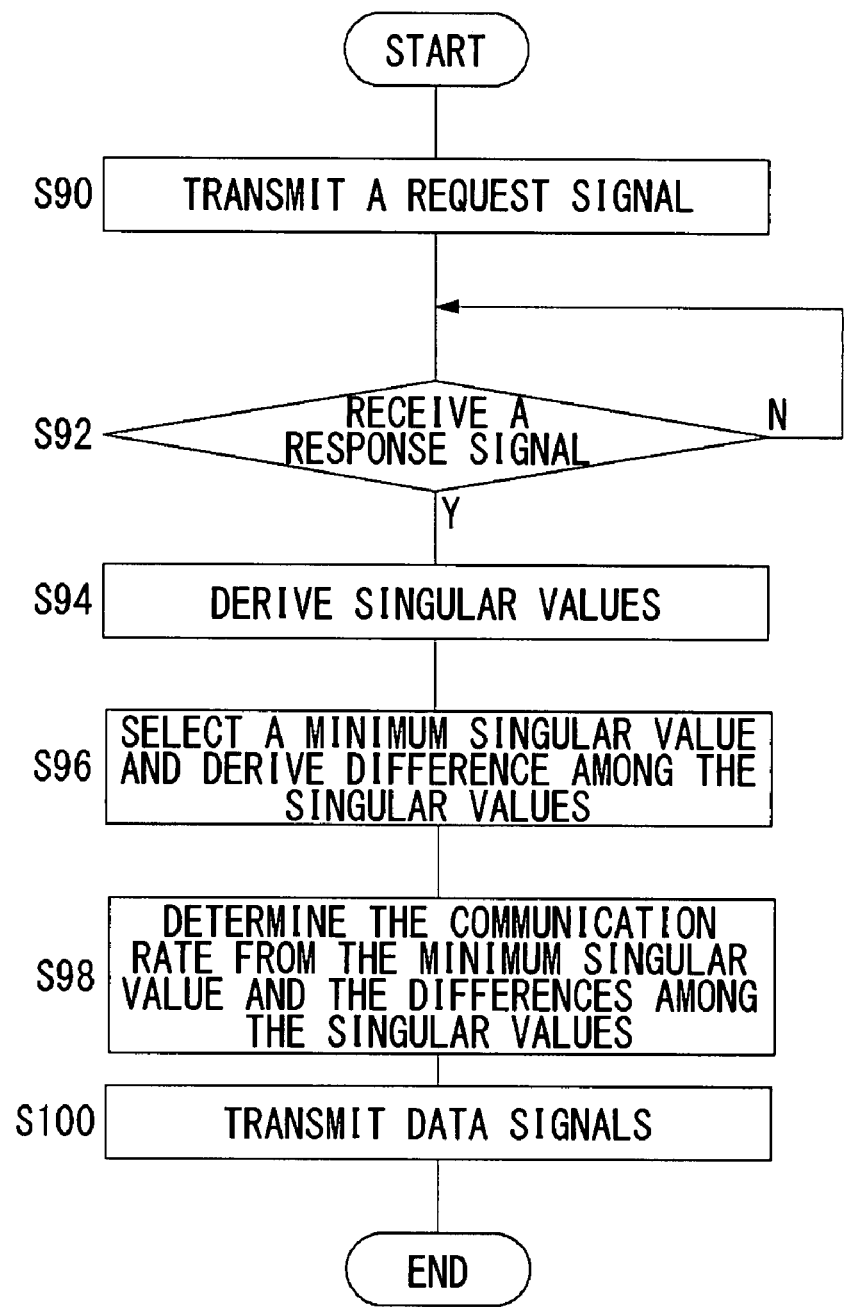
FIG. 19 is a flowchart showing a procedure for setting a communication rate in the first radio apparatus shown in FIG. 13.

An operation of the first radio apparatus 10a will now be described. FIG. 19 is a flowchart showing a procedure for setting the communication rate in the first radio apparatus 10a. The modem unit 24 and the like transmit the request signal (S90). The control unit 30 stands ready until the modem unit 24 and the like receive the response signal (N of 92). When the modem unit 24 and the like receive the response signal (Y of S92), the control unit 30 selects singular values (S94) and derives the differences among the singular values by selecting the minimum singular value (S96). The control unit 30 determines the communication rate from the differences between the minimum singular value and the singular values (S98). The IF unit 26 uses the determined coding rate, and the modem unit 24 uses the determined modulation scheme, and the modem unit 24 and the like transmit data signals (S100).

Similar to the another embodiment, a MIMO system is employed in still another modification of the exemplary embodiment. In the another embodiment which has been described above, the communication rate is determined based on the singular values. In this still another modification, the communication rate is determined based on EVM. The communication system 100 according to the still another modification is of the same type as the communication system 100 shown in FIG. 2, whereas the first radio apparatus 10a according to this modification is of the same type as the first radio apparatus 10a shown in FIG. 4.

Similar to the exemplary embodiment, the second radio apparatus 10b computes EVM. In still another modification, a plurality of EVMs are so derived as to correspond respectively to a plurality of streams. The second radio apparatus 10b transmits a plurality of EVMs by including the plurality of EVMs in the response signal. The control unit 30 in the first radio apparatus 10a selects any of the plurality of EVMs. Similar to the another modification, an EVM by which the communication rate is lowered, namely the maximum EVM, is selected. The control unit 30 derives a difference between the minimum EVM and the maximum EVM. The control unit 30 determines the communication rate, based on the maximum EVM and said difference. The processing for determining the communication rate in this still another embodiment is similar to that in the another modification, so that the repeated explanation is omitted here. That is, even when the maximum EVM is the same value, the use of a higher communication rate is determined as the difference becomes larger.

Figure 20:
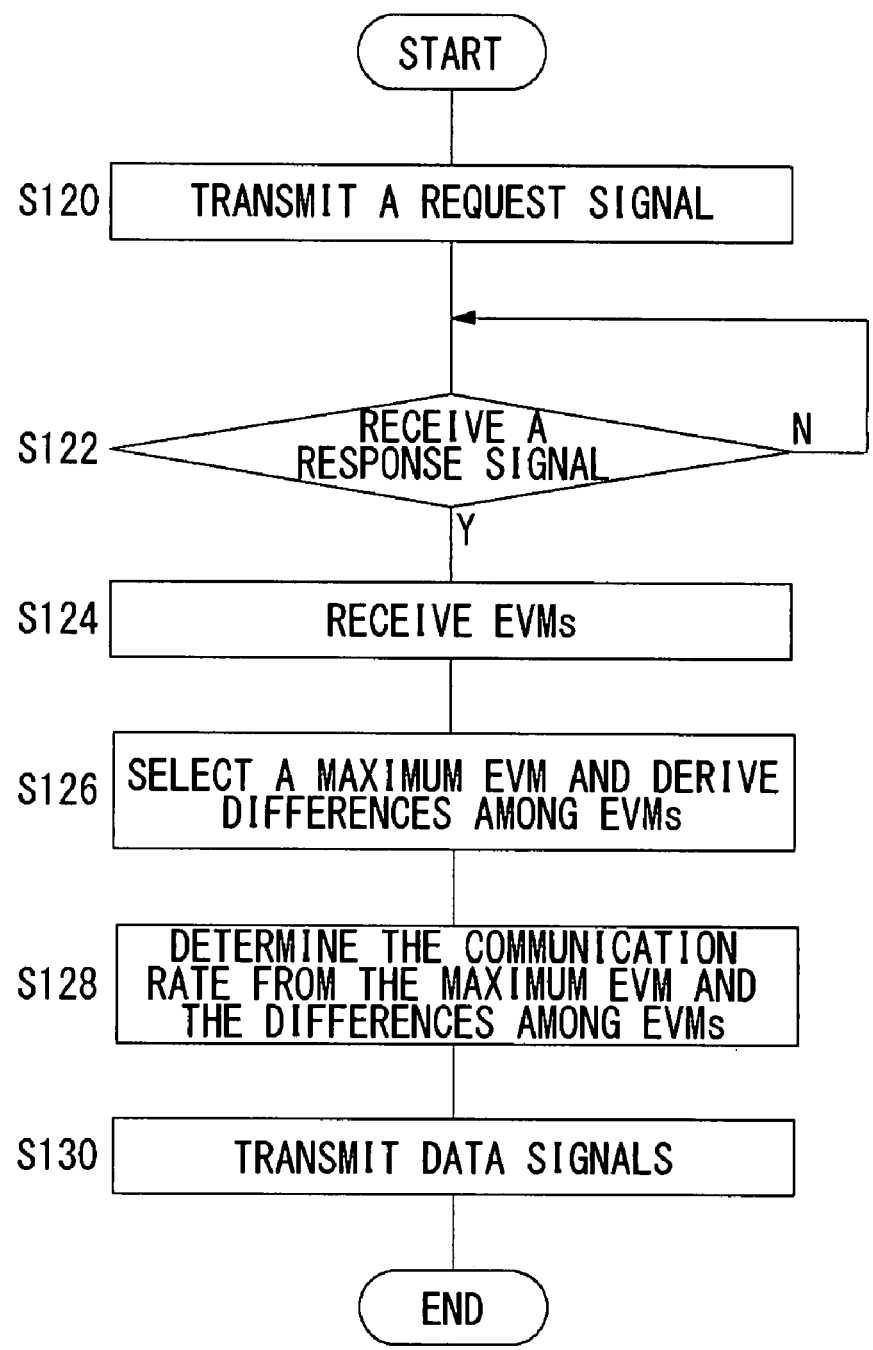
FIG. 20 is a flowchart showing a procedure for setting a communication rate, according to still another modification of an exemplary embodiment.

An operation of the first radio apparatus 10a structured as above will now be described. FIG. 20 is a flowchart showing a procedure for setting a communication rate, according to still another modification of the exemplary embodiment. The modem unit 24 and the like transmit the request signal (S120). The control unit 30 stands ready until the modem unit 24 and the like receive the response signal (N of 122). When the modem unit 24 and the like receive the response signal (Y of S122), the control unit 30 receives a plurality of EVMs (S124). The control unit 30 selects a maximum EVM and derives a differences among the EVMs (S126). The control unit 30 determines the communication rate from the maximum EVM and the differences among the EVMs (S128). The IF unit 26 uses the determined coding rate and the modem unit 24 uses the determined modulation scheme. Thereby the modem unit 24 and the like transmit data signals (S130).

According to this modification, the communication rate is determined by using the correlation values in addition to EVMs, so that the communication rate can be determined by taking the effect of delay characteristics into account. Even if EVMs indicate the same value, the coding rate is determined based on the delay characteristics in such a manner that the coding rate becomes higher. Hence, the communication rate can be determined by taking the effect of error correction into account. The coding rate is raised when the effect of error correction is large. Hence, the communication rate can be improved. Since the communication rate can be improved, the communication efficiency can be enhanced. The modulation scheme is determined from the EVMs, and the coding rate is determined from the correlation values. The modulation scheme and the coding rate are processed independently, so that the processing can be easily achieved. The communication rate is determined using the variance value of EVMs in addition to the average value of EVMs. Thus, the communication rate can be determined by taking the effect of delay characteristic into account. Since the coding rate is determined based on the coding rate, the communication rate can be determined by taking the effect of error correction into effect. All what is required for the derivation is EVMs only, so that the processing can be achieved easily.

Also, the communication rate is determined by use of the differences among the singular values in addition to a single singular value. Thus, the communication rate can be determined by taking the effect of the delay characteristics into account. The fact that the effect of error correction is large if the differences among the singular values are large is utilized, so that the appropriate coding rate can be determined. A singular value which is to correspond to a low communication rate is used as the single singular value. Thus, the communication rate which is reliably feasible can be selected. The differences among the singular values are reflected in determining the communication rate. Thus, the communication rate can be determined by taking the effect of the error correction into account. When an eigen-mode transmission is performed, the singular values are derived for the eigenmode. As a result, the thus derived singular values can be utilized and the processing can be easily realized.

Also, the communication rate is determined by use of the differences among EVMs in addition to a single EVM. Thus, the communication rate can be determined by taking the effect of the delay characteristics into account. The fact that the effect of error correction is large if the differences among EVMs are large is utilized, so that the appropriate coding rate can be determined. A singular value which is to correspond to a low communication rate is used as the single EVM. Thus, the communication rate which is reliably feasible can be selected. The differences among EVMs are reflected in determining the communication rate. Thus, the communication rate can be determined by taking the effect of the error correction into account.

The present invention has been described based on exemplary embodiments and their modifications. These are merely exemplary, and it is understood by those skilled in the art that various further modifications to the combination of each component and process thereof are possible and that such modifications are also within the scope of the present invention.

According to the exemplary embodiments of the present invention, the description has been given of a case when the number of multistreams is "4". However, the present embodiments are not limited thereto and, for example, the number of a plurality of streams may be less than "4" or may be greater than "4". In such cases, the number of streams contained in a group may be greater than "2" or the number of groups may be greater than "2". According to this modification, the present invention can be applied to a variety of the number of streams.

In an exemplary embodiment of the present invention, a matrix where the orthogonality holds among components is shown representing the relation among signs of "HT-LTFs" in the training signals. However, this should not be considered as limiting and, for example, instead of components being orthogonal to each other, it suffices if a matrix has a sign relation such that each desired component can be retrieved by a simple calculation like addition and/or subtraction. According to this modification, various kinds of sign relations can be used as a sign relation of "HT-LTFs" in the training signals.

In an exemplary embodiment of the present invention, the control unit 30 assigns a training signal to a packet signal that contains a request signal. However, this should not be considered as limiting and, for example, the control unit 30 may transmit the packet signal to which the training signal is assigned and, thereafter, transmit the packet signal that contains the request signal. According to this modification, the time length between the timing at which the training signal is received and the timing at which the response signal is to be transmitted can be made longer. That is, it suffices if a packet signal to which the training signal is assigned is transmitted.

In an exemplary embodiment of the present invention, multi-carrier signals are to be processed in the communication system 100. However, this should not be considered as limiting and, for example, single carriers may be used and processed. According to this modification, the present invention can be applied to various types of communication systems.

In an exemplary embodiment of the present invention, the second radio apparatus 10b derives the channel characteristics, H matrices and EVMs in the downlink, and coveys the thus derived values to the first radio apparatus 10a. However, this should not be considered as limiting and, for example, the first radio apparatus may derive these values or any of these values and use the thus derived values or value for the decision of the communication rate in the downlink. According to this modification, the request signal and the response signals are no longer necessary and therefore the communication efficiency can be improved.

The second radio apparatus 10b may determine the communication rate. In such a case, the operation executed in the first radio apparatus 10a of the exemplary embodiment is executed by the second radio apparatus 10b. More specifically, the second radio apparatus 10b receives the request signal from the first radio apparatus 10a. The second radio apparatus 10b derives EVMs, delay characteristics, singular values and so forth, based on the signal received from the first radio apparatus 10a. Similar to the exemplary embodiment, the second radio apparatus 10b determines the communication rate, based on the thus derived EVMs, delay characteristics, singular values and so forth. Finally, the second radio apparatus 10b transmits to the first radio apparatus 10a the response signal containing the information on the thus determined communication rate. The first radio apparatus 10a performs communications according to the communication rate contained in the response signal. According to the modification, the amount of information contained in the response signal can be reduced.

In an exemplary embodiment of the present invention, the second radio apparatus 10b conveys the average value of EVMs and the covariance value thereof to the first radio apparatus 10a. However, this should not be considered as limiting and, for example, the second radio apparatus 10b may convey per-subcarrier EVM to the first radio apparatus 10a, and the first radio apparatus 10a may derive the average value of EVMs and the covariance value thereof. According to this modification, the processing amount in the second radio apparatus 10b can be reduced.

While the preferred embodiments of the present invention and modifications thereof have been described using specific terms, such description is for illustrative purposes only, and it is to be understood that changes and variations may be further made without departing from the spirit or scope of the appended claims.

What is claimed is:

1. A radio apparatus
  a communication unit which performs communications with a targeted radio apparatus by varying a communication rate therefor;
  an acquiring unit which acquires a delay characteristic in a radio channel between said communication unit and the targeted radio apparatus, and an error vector by the radio channel; and
  a decision unit which determines a communication rate to be set for said communication unit, based on the delay characteristic and the error vector acquired by said acquiring unit,
  wherein said communication unit sets at least a coding rate of error correction and a modulation scheme, as the communication rate, and
  wherein said decision unit determines the coding rate based only on the delay characteristic and determines the modulation scheme based only on the error vector.

2. A radio apparatus comprising:
  a communication unit which performs communications with a targeted radio apparatus by varying a communication rate therefor;
  an acquiring unit which acquires error vectors by a radio channel between said communication unit and the targeted radio apparatus; and
  a decision unit which determines a communication rate to be set for said communication unit, based on an average value of the error vectors acquired by said acquiring unit and a degree of variation in the error vectors, wherein said communication unit sets at least a coding rate of error correction and a modulation scheme, as the communication rate, and wherein said decision unit determines the coding rate based only on the degree of variation in the error vectors and determines the modulation scheme based only on the average value of the error vectors.

3. A radio apparatus comprising:

a communication unit which performs communications with a targeted radio apparatus by varying a communication rate therefor wherein the communications use a plurality of streams;

an acquiring unit which acquires, per stream, a physical quantity on signal strength in a radio channel between said communication unit and the targeted radio apparatus; and a decision unit which determines a communication rate to be set for said communication unit, based on any of a plurality of physical quantities, acquired by said acquiring unit, which correspond mutually to the plurality of streams and differences among the plurality of physical quantities, wherein said acquiring unit acquires an error vector as the physical quantity, and wherein the larger the difference between a plurality of error vectors, the higher the communication rate determined by said decision unit to be used.

4. A radio apparatus according to claim 3, wherein as any of the plurality of physical quantities said decision unit uses a physical quantity which is to correspond to a lower communication rate among communication rates suitable respectively for the plurality of physical quantities.

5. A radio apparatus comprising:

a communication unit which performs communications with a targeted radio apparatus by varying a communication rate therefor wherein the communications use a plurality of streams;

an acquiring unit which acquires, per stream, a physical quantity on signal strength in a radio channel between said communication unit and the targeted radio apparatus; and a decision unit which determines a communication rate to be set for said communication unit, based on any of a plurality of physical quantities, acquired by said acquiring unit, which correspond mutually to the plurality of streams and differences among the plurality of physical quantities, wherein said communication unit has a plurality of first antennas by which said communication unit performs communications with the targeted radio apparatus having a plurality of second antennas, wherein said acquiring unit acquires singular values of a channel matrix as the physical quantity wherein the channel matrix has the number of elements determined by the number of the first antennas and the number of the second antennas and has values of the elements representing channel characteristics between the plurality of first antennas and the plurality of second antennas, respectively, and wherein the larger the difference between a plurality of error vectors, the higher the communication rate determined by said decision unit to be used.

6. A communication method, comprising:

performing communications with a targeted radio apparatus by varying a communication rate therefor;

acquiring error vectors by a radio channel between the radio apparatus and the targeted radio apparatus; and determining a communication rate to be set, based on an average value of the acquired error vectors and a degree of variation in the error vectors, wherein in performing communication, at least a coding rate of error correction and a modulation scheme are set, as the communication rate, and in determining a communication rate, the coding rate is determined based only on the delay characteristic and the modulation scheme is determined based only on the error vector.

7. A communication method, comprising:

performing communications with a targeted radio apparatus by varying a communication rate therefor wherein the communications use a plurality of streams;

acquiring, per stream, a physical quantity on signal strength in a radio channel between the radio apparatus and the targeted radio apparatus; and determining a communication rate to be set, based on any of a plurality of physical quantities acquired in said acquiring, which correspond mutually to the plurality of streams, and based on differences among the plurality of physical quantities, wherein said acquiring acquires an error vector as the physical quantity, and wherein the larger the difference between a plurality of error vectors, the higher the communication rate determined by the determining.

8. A communication method, comprising:

performing communications with a targeted radio apparatus by varying a communication rate therefor wherein the communications use a plurality of streams;

acquiring, per stream, a physical quantity on signal strength in a radio channel between the radio apparatus and the targeted radio apparatus; and determining a communication rate to be set, based on any of a plurality of physical quantities acquired in said acquiring, which correspond mutually to the plurality of streams and on differences among the plurality of physical quantities, wherein, in performing communications, a plurality of first antennas are used by which to perform communications with the targeted radio apparatus having a plurality of second antennas, wherein said acquiring acquires singular values of a channel matrix as the physical quantity wherein the channel matrix has the number of elements determined by the number of the first antennas and the number of the second antennas and has values of the elements representing channel characteristics between the plurality of first antennas and the plurality of second antennas, respectively, and wherein the larger the difference between a plurality of singular values, the higher the communication rate determined by the determining.

* * * * *